US008773675B2

(12) United States Patent
Xiao

(10) Patent No.: US 8,773,675 B2
(45) Date of Patent: Jul. 8, 2014

(54) PROVIDING AN INTEGRATED, FEATURE ORIENTED PRINTER SELECTION SYSTEM

(75) Inventor: Zhenning Xiao, Renton, WA (US)

(73) Assignee: Ricoh Company, Ltd., Tokyo (JP)

( * ) Notice: Subject to any disclaimer, the term of this patent is extended or adjusted under 35 U.S.C. 154(b) by 164 days.

(21) Appl. No.: 13/333,454

(22) Filed: Dec. 21, 2011

(65) Prior Publication Data

US 2013/0163014 A1 Jun. 27, 2013

(51) Int. Cl.
*G06F 3/12* (2006.01)
*G03G 21/00* (2006.01)

(52) U.S. Cl.
USPC ............................. 358/1.13; 358/1.15; 399/75

(58) Field of Classification Search
USPC ................................ 358/1.13, 1.15
See application file for complete search history.

(56) References Cited

U.S. PATENT DOCUMENTS

| | | | |
|---|---|---|---|
| 5,580,177 A | 12/1996 | Gase et al. | |
| 6,094,548 A * | 7/2000 | Gunning et al. | 399/75 |
| 6,529,286 B1 | 3/2003 | King | |
| 6,825,941 B1 | 11/2004 | Nguyen et al. | |
| 2002/0051204 A1 | 5/2002 | Ohara | |
| 2002/0120742 A1* | 8/2002 | Cherry | 709/226 |
| 2002/0135798 A1 | 9/2002 | Simpson et al. | |
| 2003/0090694 A1* | 5/2003 | Kennedy et al. | 358/1.13 |
| 2003/0103235 A1 | 6/2003 | Gomi | |
| 2003/0231328 A1 | 12/2003 | Chapin et al. | |
| 2004/0061890 A1 | 4/2004 | Ferlitsch | |
| 2007/0133044 A1* | 6/2007 | Tanaka | 358/1.15 |
| 2007/0233834 A1 | 10/2007 | Hattori et al. | |
| 2010/0188688 A1* | 7/2010 | Selvaraj et al. | 358/1.15 |

FOREIGN PATENT DOCUMENTS

| | | |
|---|---|---|
| EP | 0656581 | 6/1995 |
| EP | 0893753 | 1/1999 |
| EP | 1 178 392 | 2/2002 |
| JP | 9006557 A | 1/1997 |
| JP | 2001142665 A | 5/2001 |
| JP | 2001282492 A | 10/2001 |
| JP | 2003330638 A | 11/2003 |
| JP | 2005071175 A | 3/2005 |
| JP | 2005228243 A | 8/2005 |
| WO | WO 01/31432 | 5/2001 |

OTHER PUBLICATIONS

Cohen, Y., "SNMP—Simple Network Management Protocol," retrieved from website < http://www2.rad.com/networks/1995/snmp/snmp.htm >, printed on May 18, 2007 (8 pages).

(Continued)

*Primary Examiner* — Fred Guillermety
*Assistant Examiner* — Henok A Shiferaw
(74) *Attorney, Agent, or Firm* — Hickman Palermo Truong Becker Bingham Wong LLP; Daniel D. Ledesma

(57) ABSTRACT

Techniques are disclosed for providing and using an integrated printer driver that can be used to print to multiple printing devices. The printer driver executes on a client device. A user selects features and options, displayed in a user interface of the printer driver, for a print job without knowing which printing device will eventually process the print job. Based on the selected features and options, the printer driver determines the printing device to which the print job will be sent. In an embodiment, a printer server receives capabilities data from multiple printing devices and builds, based on the capabilities data, a database of printer description data, from which the user interface that is displayed to an end-user is generated. In an embodiment, the printer server applies an administrative policy that filters out capabilities data of one or more printing devices that are registered with the printer server.

19 Claims, 17 Drawing Sheets

(56) References Cited

OTHER PUBLICATIONS

European Patent Office, "European Search Report," Foreign application No. 08150551.3/1245, dated Aug. 28, 2008 (7 pages).
Claims, Foreign application No. 08150551.3/1245 dated Aug. 2008 (5 pages).
European Patent Office, "European Search Report," Foreign application No. 08150570.3/1245, dated Nov. 4, 2008 (8 pages).
Microsoft, "AsyncUI Notifications," 2005 Microsoft Corporation, retrieved on website < http://www.microsoft.com/whdc/device/print/AsyncUI.mspx >, written May 9, 2006 (11 pages).

* cited by examiner

FIG. 10

Server GPDD  1010

```
<GPDD Value="Server Level">
<DeviceList>
<Device>
  <DeviceID Value="00031" />
  <DeviceName Value="Ricoh MP C3300" />
  <DeviceBuilding Value="Building 1" />
  <DeviceFloor Value="Floor 1" />
  <DeviceDomainName Value="Companyxxx" /
>
  <DeviceConnectType Value="Wired
Network" />
  <DeviceWiredType Value="Wired" />
  <DeviceType Value="Laser" />
  <DeviceColor Value="Color" />
  <DeviceSpeed Value="Low" />
  <DeviceFeature Value="Sides">
    <DisplayName xml:lang="en-US">Print on
Both Sides</DisplayName>
    <FeatureOption Value="OneSided">
      <DisplayName xml:lang="en-US">None</
DisplayName>
    </FeatureOption>
    <FeatureOption
Value="TwoSidedLongEdge">
      <DisplayName xml:lang="en-US">Flip on
long edge</DisplayName>
    </FeatureOption>
    <FeatureOption
Value="TwoSidedShortEdge">
      <DisplayName xml:lang="en-US">
Flip on short
edge
      </DisplayName>
    </FeatureOption>
  </DeviceFeature>
</Device>
</DeviceList>
</GPDD>
```

Driver GPDD  1020

```
<GPDD Value="Driver Level">
<DeviceList>
<Device>
  <DeviceID Value="00031" />
  <DeviceName Value="Ricoh MP C3300" />
  <DeviceBuilding Value="Building 1" />
  <DeviceFloor Value="Floor 1" />
  <DeviceDomainName Value="Companyxxx" /
>
  <DeviceConnectType Value="Wired
Network" />
  <DeviceWiredType Value="Wired" />
  <DeviceType Value="Laser" />
  <DeviceColor Value="Color" />
  <DeviceSpeed Value="Low" />
  <DeviceFeature Value="Sides">
    <DisplayName xml:lang="en-US">Print on
Both Sides</DisplayName>
    <FeatureOption Value="OneSided">
      <DisplayName xml:lang="en-US">None</
DisplayName>
    </FeatureOption>
    <FeatureOption
Value="TwoSidedLongEdge">
      <DisplayName xml:lang="en-US">Flip on
long edge</DisplayName>
    </FeatureOption>
    <FeatureOption
Value="TwoSidedShortEdge">
      <DisplayName xml:lang="en-US">
Flip on short
edge
      </DisplayName>
    </FeatureOption>
  </DeviceFeature>
</Device>
</DeviceList>
</GPDD>
```

UI GPDD  1030

```
<GPDD Value="UI Level">
<User Name="user1">
<DeviceList>
<Device>
  <DeviceID Value="00031" />
  <DeviceName Value="Ricoh MP C3300" />
  <DeviceBuilding Value="Building 1" />
  <DeviceFloor Value="Floor 1" />
  <DeviceDomainName Value="Companyxxx" /
>
  <DeviceConnectType Value="Wired
Network" />
  <DeviceWiredType Value="Wired" />
  <DeviceType Value="Laser" />
  <DeviceColor Value="Color" />
  <DeviceSpeed Value="Low" />
  <DeviceFeature Value="Sides">
    <DisplayName xml:lang="en-US">Print on
Both Sides</DisplayName>
    <FeatureOption Value="OneSided">
      <DisplayName xml:lang="en-US">None</
DisplayName>
    </FeatureOption>
    <FeatureOption
Value="TwoSidedLongEdge">
      <DisplayName xml:lang="en-US">Flip on
long edge</DisplayName>
    </FeatureOption>
    <FeatureOption
Value="TwoSidedShortEdge">
      <DisplayName xml:lang="en-US">
Flip on short
edge
      </DisplayName>
    </FeatureOption>
  </DeviceFeature>
</Device>
</DeviceList>
</User>
</GPDD>
```

Select Printer

UI for Integrated Feature Selection Printer Driver 1600

Printer information
☐ Any Printer
☐ Location  [Any / Same Building / Same Floor / Same Company]
☐ Wired/Wireless  [Any ▼]
☑ Security Based  [Non-Secured only ▼]
☐ Printer Type  [Any ▼]
☑ Color / BW  [Color ▼]
☐ Printer Speed  [Any ▼]
☑ Input Bin Size  [Above 500 Sheets ▼]
☑ Connection Type  [Network ▼]
☐ User Custom list  [Custom]

1610

Printer Collection List: 1620

Ricoh Aficio MP 3500 PCL6    Ricoh Aficio MP C3500 PCL6    Ricoh Aficio SP 8200DN PCL6

[Add a Printer...]   [Remove a Printer]

Integrated Driver UI Advanced Features 1630

Integrated Driver UI Advanced Document Settings
├─ Paper/Output
│   ├─ Paper Size:  [Letter ▼]
│   └─ Copy Count: 1 Copy
├─ Graphic
│   └─ TrueType Font: Substitute with Device Font
├─ Document Options
│   ├─ Advanced Printing Features: Enabled
│   ├─ Pages per Sheet Layout: Right then Down
│   ├─ Booklet Binding Edge: On Left Edge
│   └─ Print Optimization: Enabled
└─ Printer Features
    ├─ Slip Sheet: Off
    ├─ Slip Sheet Paper Source: Tray1
    ├─ Output Bin: Printer Default
    ├─ Staple: Off
    ├─ Punch: Off
    ├─ Edge to Edge Print: On
    ├─ Print density: Toner Saver - Off
    ├─ Print Quality: Edge Smoothing – Off
    └─ TrueType Font Download Option: Bitmap

[Cancel]   [OK]

FIG. 16

PROVIDING AN INTEGRATED, FEATURE ORIENTED PRINTER SELECTION SYSTEM

CROSS-REFERENCE TO RELATED APPLICATIONS

This application is related to U.S. patent application Ser. No. 11/830,129, filed Jul. 30, 2007, the entire contents of which is hereby incorporated by reference as if fully set forth herein.

FIELD OF THE INVENTION

The present invention relates to printing and, more particularly, providing an integrated driver than can print to multiple printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A device driver or software driver is a computer program allowing higher-level computer programs to interact with a hardware device. In the printing context, a printer driver allows applications (e.g., Microsoft Word, Adobe Acrobat, SmartDraw, etc.) to print to a printing device without the applications being required to know the technical details of the printing device. A printer driver converts electronic data, from an application, to a form specific to a particular printing device.

Current printer drivers are device-oriented and, consequently, suffer significant drawbacks when multiple devices persist. For example, manufacturers must create a printer driver for each device model it produces. Each printer driver contains pre-defined device features. Most printer drivers do not support dynamic feature support. Currently, universal printer drivers provide some very limited dynamic feature support by defining a limited set of features and then turning some features on or off through SNMP device querying.

Further, a user must manually install one printer driver for each connected device into the local operating system of the user's device. The user must first know the exact device model and then download a compatible printer driver from the manufacture for that model. When multiple printing devices exist across a network, multiple drivers must be installed in order to be able to use those printing devices. If a user moves her computing device (e.g., laptop) so that the computing devices is in a different network and the user desires to be able to print to printing devices in that different network, then the user must add more printer drivers to her computing device. As a result of installing numerous printer drivers, the user must retrieve all necessary printer information from every installed printer driver. Thus, creating a simple print job can quickly become a complicated job.

Additionally, under current printer driver architectures, each printer driver displays its own user interface (UI). If user selects a different printing device, then an operating system must open a new printer driver with a different UI for that printing device.

Some current printer drivers are considered "universal" drivers in that such drivers support multiple models. However, one universal driver can only support one device at any given time. When multiple printing devices are present on one network, multiple instances of universal drivers must be installed into the operating system of a client device.

As a consequence of current printer driver architectures, if a user desires to use a printer feature (such as hole punching) and the user does not know which printing device supports that printer feature, then the user must open each printer driver's UI in order to determine which printing device is capable of that printer feature.

SUMMARY

In an embodiment, a client device receives print feature and option data that include features and options supported by a plurality of printing devices. A print driver executing on the client device generates user interface based on the print feature and option data. The user interface indicates the features and options supported by the plurality of printing devices. Input that selects one or more features and options reflected in the feature and option data is received from a user through the user interface. Based on the input, the print driver selects a particular printing device from among the plurality of printing devices, generates a print job, and causes the print job to be sent to the particular printing device.

In an embodiment, a printer server receives, from a first printing device, first print feature and option data that indicates features and options supported by the first printing device. The printer server receives, from a second printing device that is different than the first printing device, second print feature and option data that indicates features and options supported by the second printing device. The first and second print feature and option data is sent to a client device. After the first and second print feature and option data are sent to the client device, the client device executes a printer driver that includes the first and second print feature and option data and is configured to send print jobs to the first and second printing devices.

BRIEF DESCRIPTION OF THE DRAWINGS

In the drawings:

FIG. 10 is a block diagram that depicts example generic printer description data for each of a server, a driver, and a user interface, according to an embodiment;

FIG. 16 is a block diagram that depicts an example user interface that allows a user to select one or more features and options for a print job, according to an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments provide an integrated printer feature selection system from a printer driver. In an embodiment, a single, combined UI for managing multiple network connected devices is presented. In an embodiment, a printer driver system dynamically queries and updates itself (e.g., automatically or upon being requested) with all connected device information across mobile or business network environments. The printer driver system simplifies the process of multi-device management and provides a straight-forward user printing experience under complicated network environments.

In an embodiment, a printer driver enables a computer operating system (OS) to manage multiple networked devices in dynamic environments. Network devices can be connected on a local Ethernet network, or on a remote network through internet protocol. An OS might assign a unique port for each connected device and provide APIs for data communication. The printer driver provides a unified, feature-oriented UI for multiple printing devices and automatically selects the printing device according to a user's selected feature set.

Printer Feature Selection System

Figure 1:
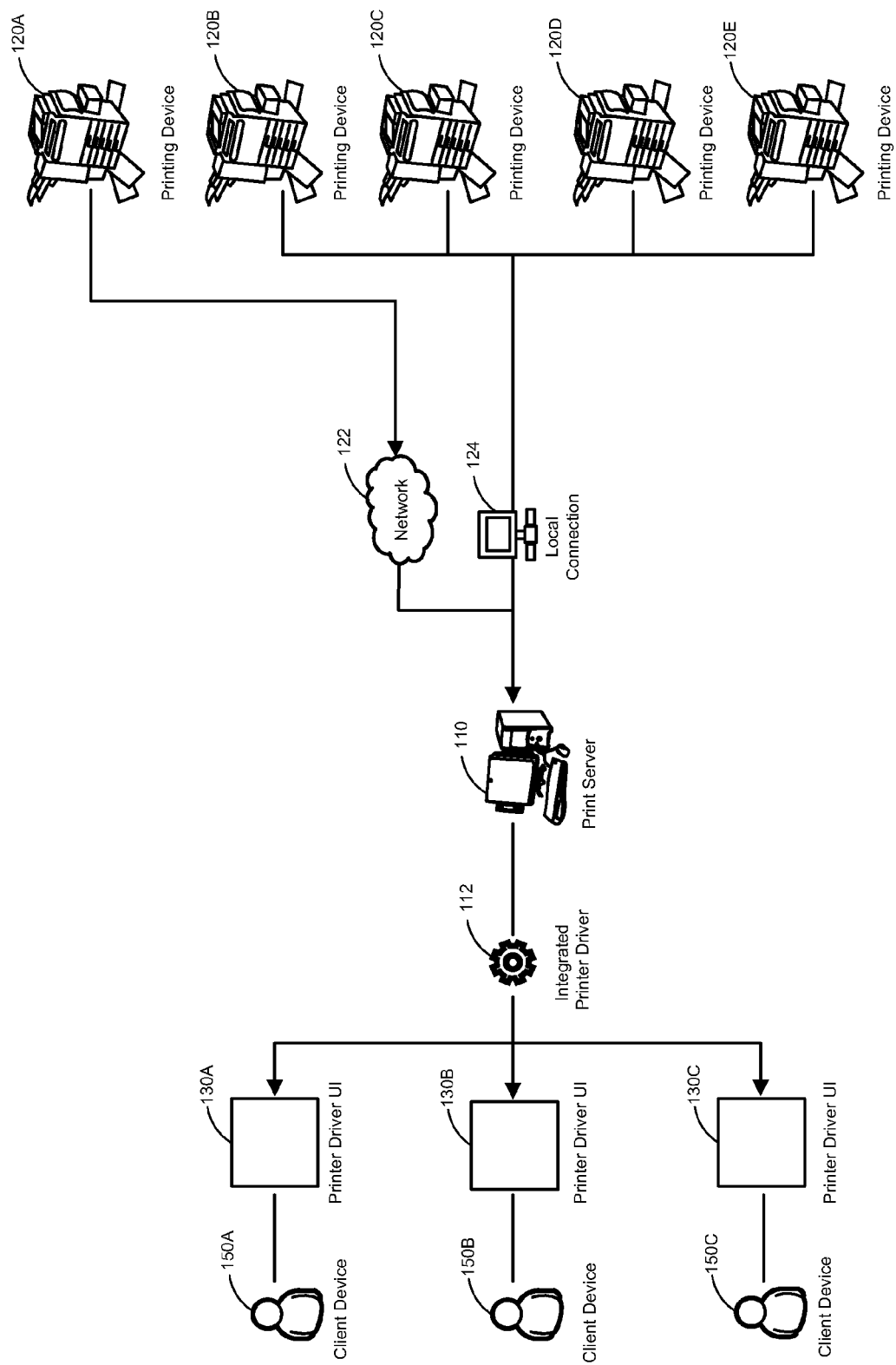
FIG. 1 is a block diagram that depicts an example printer feature selection system, according to an embodiment.

FIG. 1 is a block diagram that depicts an example printer feature selection system 100, according to an embodiment. System 100 comprises a printer server 110, an integrated printer driver 112, printing devices 120A-E, network 122, local connection 124, printer driver UIs 130A-C, and client devices 140A-C.

Printer server 110 is a network device that comprises one or more processors and memory and that is communicatively coupled to printing devices 120A-E and client devices 140A-C. Printer server 110 communicates with printing device 120A via network 122 and communicates with printing devices 120A-E and user client 130A-C via a local connection 124. Examples of network 122 include, without limitation, a Wide Area Network (WAN), the Internet, or one or more terrestrial, satellite or wireless links. Examples of local connection 124 include, without limitation, a Local Area Network (LAN), Ethernet, or one or more terrestrial, satellite or wireless links.

Printer server 110 receives device capabilities data from printing devices 120A-E. Device capabilities data is data that specifies a device's currently installed features and options, i.e., allowed values for each feature, of printing devices 120A-E. Examples of printing device features include, without limitation, a paper tray, duplex printing, stapling, hole punching, etc. Each feature has one or more options, i.e., values. Some features may only have two options. For example, duplex unit has two options, such as "Installed" or "Not Installed." Other features, for example, paper size, may have many options, e.g., "A4", "legal", "8½×11", etc.

Embodiments are not limited to any particular technique for communicating device capabilities data from printing devices 120A-E to printer server 110. For example, such communication might be achieved through SNMP or WSD technologies. Recent development of WSD technologies on a network provides opportunities for more advanced device management (e.g., relative to SNMP). Such development allows any network device to report its full (e.g., printing) capabilities during the establishment of a connection between the network device and another network device, such as a network server.

Thus, printer server 110 may automatically detect one of printing devices 120A-E. Alternatively, printer server 110 may be notified of one or more of printing devices 120A-E by an administrator. Upon detection, printer server 110 queries the detected printing device (local or remote) for information about the printing device including, but not limited to, print features and options and other capabilities supported by the printing device.

Based on the device capabilities data, printer server 110 generates integrated printer driver 112. Printer server 110 then sends integrated printer driver 112 to one or more of client devices 140A-C. Additionally or alternatively, printer server 110 sends the device capabilities data to one or more of client devices 140A-C that (already) execute an integrated printer driver at the time printer server 110 receives the device capabilities data. Such "already-existing" integrate printer drivers are automatically updated to include the new device capabilities data.

The functionality of printer server 110 may be implemented using stored program logic, in a special-purpose computer or loaded from one or more non-transitory media into the memory of a general-purpose computer and then executed.

Client devices 140A-C may be implemented as any type of client device. Examples of client devices 140A-C include, without limitation, personal or laptop computers, workstations, cellular telephony devices such as cell phones, personal digital assistants (PDAs), etc.

Printer server 110 builds an information database and creates various data structures for integrated printer driver 112. Such data structures may be accessed by UI components of integrated printer driver 112 when driver 112 displays an integrated UI to a user of one of client devices 140A-C.

After integrated printer driver 112 is received by and installed at client devices 140A-C, printer driver 112 displays an integrated UI that contains features from multiple printing devices (e.g., printing devices 120A-E). Some features on the UI are automatically enabled or disabled based on a feature set a user has previously selected and whether any devices can support the selected feature set. Based on the feature set of the user's selection, printer driver 112's UI determines which printer will be used for printing, and then saves the feature set to a destination print job ticket. A rendering component of printer driver 112 sends a print job to a printing device (e.g., printing device 120C) defined in the job ticket.

Generating A Print Job

Figure 2:
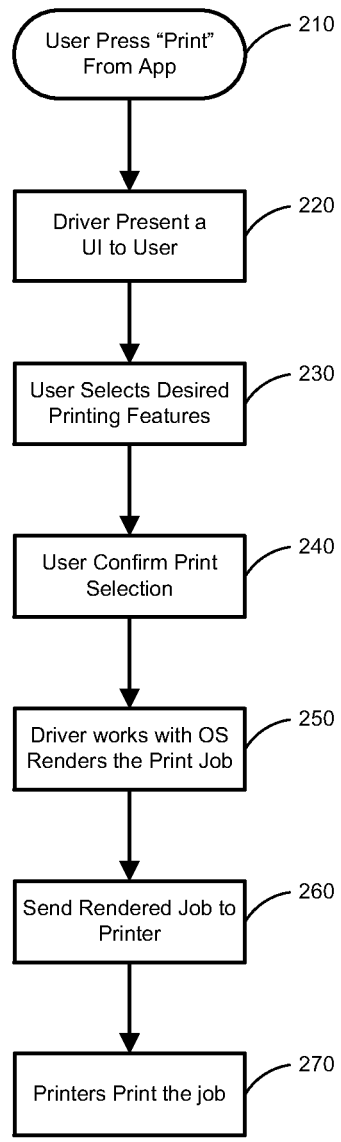
FIG. 2 is a flow diagram that depicts an example process for generating a print job, according to an embodiment.

FIG. 2 is a flow diagram that depicts an example process 200 for generating a print job, according to an embodiment. At step 210, a user selects "Print" from an application executing on the user's computing device, such as a laptop or tablet computer. At step 220, a printer driver on the user's computing device causes a UI to be displayed to the user. At step 230, the user selects a number of printing features and options. At step 240, the user confirms the print selection, which may comprise the user selecting an "OK" or "Complete" button. At step 250, the printer driver communicates with the operating system (OS) of the user's computing device in order to render a print job. At step 260, the printer driver sends the print job to a particular printing device. At step 270, the particular printing device generates one or more printed documents reflected in the print job.

When making a print job, a user is typically more interested in directly using a special device feature rather than differentiating various devices' capabilities. Therefore, in an embodiment, process 200 does not require the user to select any printing device. Instead, the printer driver selects the particular printing device based on the selected features and options.

Printer Driver Components

Figure 3:
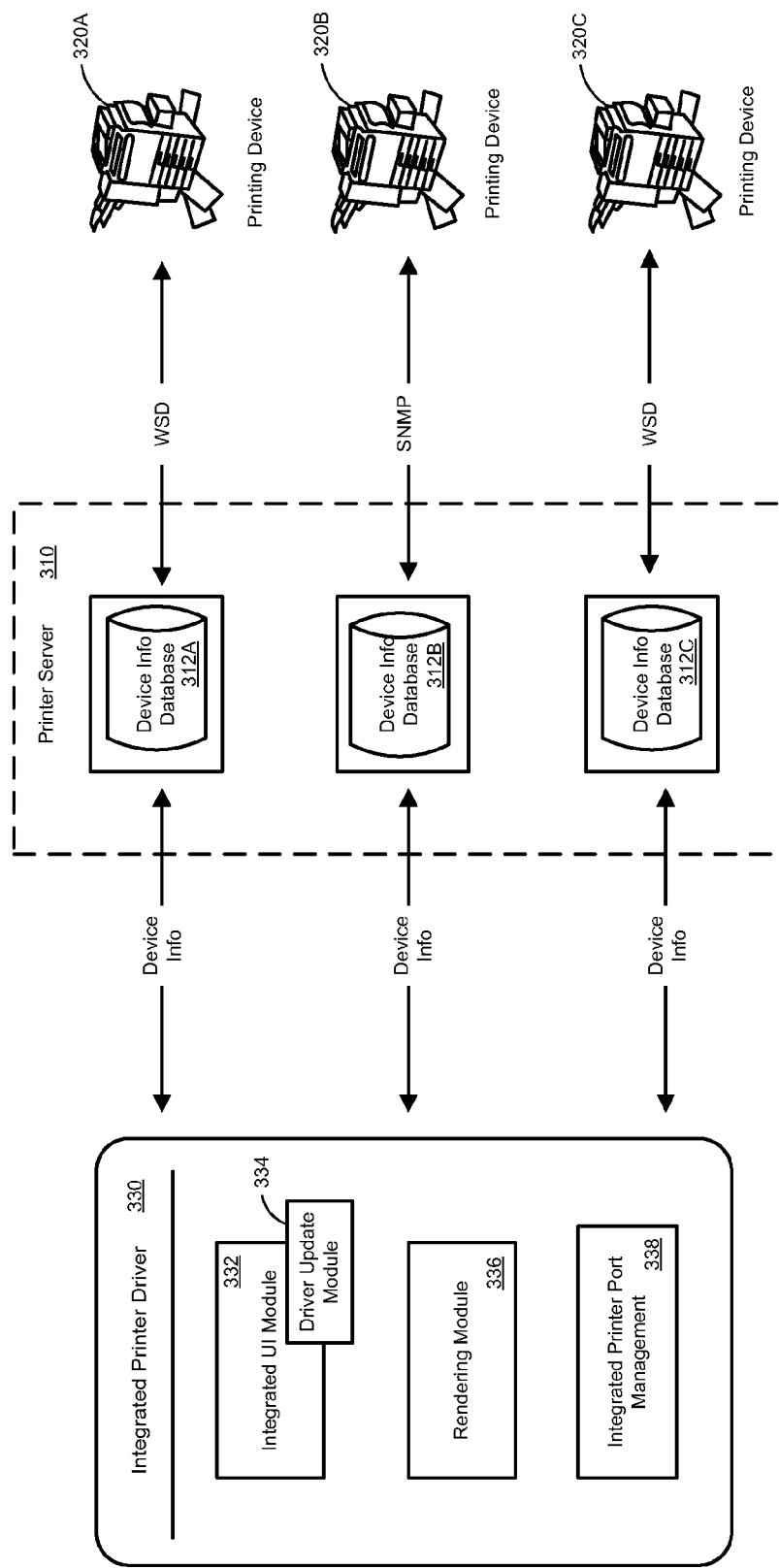
FIG. 3 is a block diagram that depicts components of a printer server and of an integrated printer driver, according to an embodiment.

FIG. 3 is a block diagram that depicts example components of a printer server 310 and of an integrated printer driver 330, according to an embodiment. Printer server 310 includes device information databases 312A-C, one for each of printing devices 320A-C. Thus, device information database 312A contains information about printing device 320A, device information database 312B contains information about printing device 320B, and so forth. Although depicted as separate databases 312A-C, databases 312A-C may be stored on the same storage device (not depicted).

According to FIG. 3, printer server 310 communicates with printing devices 320A and 320C using Web Services Discovery in order for printer server 310 to retrieve information (including features and options) about printing devices 320A and 320C. Web Service Discovery is one example of a standard discovery protocol that printer server 310 and printing devices 320A and 320C implement, or at least a version thereof. Also, printer server 310 communicates with printing device 320B using SNMP (or Simple Network Management Protocol).

In FIG. 3, integrated printer driver 330 executes on a client device and includes four components: integrated UI module 332, driver update module 334, rendering module 336, and integrated printer port management module 338. Integrated UI module 332 generates a user interface (UI) and causes the UI to be displayed on a screen of the client device upon which integrated printer driver 330 is installed. Driver update module 334 is responsible for obtaining information from printer server 310 about one or more printing devices that printer server 310 discovers after integrated printer driver 330 is installed on the client device.

Rendering module 336 receives feature selections (whether user selected, default, or a combination of both), determines which printing device of multiple printing devices to print one or more documents, and generates a print job that reflects the one or more documents and the feature selections. Rendering module 336 passes the print job to integrated printer port management module 338.

Integrated printer port management module 338 is responsible for sending the print job to the appropriate printing device. Integrated printer port management module 338 may implement one or multiple communication protocols in order to send the print job to the appropriate printing device. For example, printer driver 330 might send one print job to a first printing device identified in printer driver 330 via Web Services Device port and printer driver 330 might send one print job to a second printing device identified in printer driver 330 via TCP/IP port.

Printing Device Information Data Flow

Figure 4:
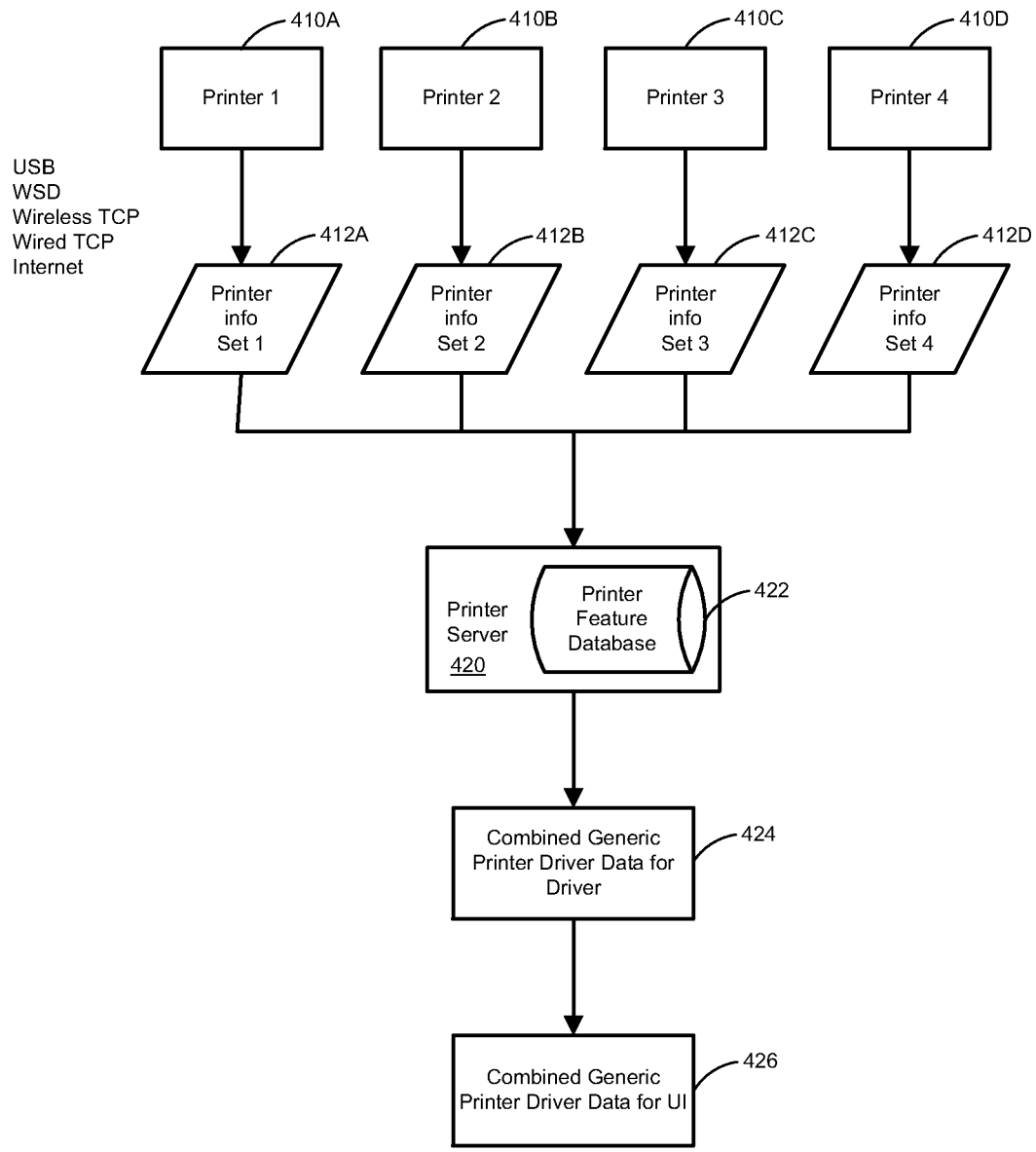
FIG. 4 is a block diagram that depicts a data flow of printing device information from multiple printing devices to a printer server, according to an embodiment.

FIG. 4 is a block diagram that depicts a data flow of printing device information from multiple printing devices 410A-D to a printer server 420, according to an embodiment. Each printing device 410A sends a set of printing information to printer server 420. For example, printing device 410A sends printer information set 412A to printer server 420, printing device 410B sends printer information set 412B to printer server 420, and so forth. Printing devices 410A-D may communicate with printer server 420 using one of communication methods, such as USB (or Universal Serial Bus), wireless TCP, and wired TCP, or the Internet. Although FIG. 4 depicts four printing devices 410A-D, other embodiments of the invention may include more or fewer printing devices.

Printer server 420 receives printer information sets 412A-D and, in an embodiment, applies one or more filter criteria to printer information sets 412A-D. The one or more filter criteria may be used to identify which printing devices are not allowed to be used (or "seen") by client devices that are connected to printer server 420. In this embodiment, printer server 420 compares the one or more filter criteria to one or more attributes of a printing device (e.g., 410A), which are reflected in a printer information set (e.g., 412A) received from that printing device. Example filter criteria include whether the printing device supports a certain security policy or any security, whether the printing device supports a particular page description language (PDL), or any device with particular firmware versions. Additionally or alternatively, one or more filter criteria includes a list of printing devices that are allowed to be used by client devices that are connected with printer server 420 (e.g., a "white" list) or a list of printing devices that are not allowed to be used by client devices that are connected to printer server 420 (e.g., a "black" list).

The one or more filter criteria may be established by a company administrator, or an administrator that is authorized by a business entity that owns and/or manages the local network.

If a printing device is not "filtered out" after the filter stage, then printer server 420 stores the printer information set of that printing device in a printer feature database 422. The data stored therein is referred to as the server generic printer description data (or "Server GPDD"). The Server GPDD, on a server when a client device is connecting to a corporate domain network, or on the client device when the client device is disconnected from a corporate domain network, defines information on all printing devices (whether connected or not connected) that are available for all users of that client device.

In an embodiment, printer information sets of printing devices that are "filtered" out after the filter stage are stored separate from the Server GPDD. Such storage may be on the same storage device that stores on the Server GPDD or on a different storage device. Such printer information sets may be maintained if, for example, the one or more filter criteria are later changed or updated, for example through user input. In such a scenario, the "excluded" printer information sets may be evaluated again based on the updated filter criteria. Such a re-evaluation might be triggered based on the changing of the one or more filter criteria. One or more of the excluded printer information sets might then pass the filter stage and end up being stored as part of the Server GPDD.

In an embodiment, the Server GPDD may be further filtered based on one or more additional filter criteria. Such additional criteria may be established by a driver administrator, who may be the same or different than the administrator that defines the filter criteria referenced above. Examples of such additional filter criteria include those criteria described previously and whether a particular user is allowed to use a particular printing device, which may be determined in multiple ways, such as a pre-defined list of printing devices that the particular user is allowed to use. The printer information sets of printing devices that are not "filtered out" by this additional filter criteria are referred to as "Driver GPDD." The Driver GPDD 424 defines information on all printing devices (whether connected or not) that are available for a particular user. Thus, each client device that is communicatively coupled to (or registered with) printer server 420 might receive a different Driver GPDD. For example, the Server GPDD may include information only about printing devices 410A-C and not printing device 410D. Afterward, Driver GPDD 424 for one client device might include information only about printing devices 410A-B while Driver GPDD 424 for another client device might include information only about printing devices 410A and 410C.

The Driver GPDD 424 of a particular user becomes part of an integrated printer driver (whether generated by printer server 420 or another entity) that is installed on a client device of the particular user.

In an embodiment, the Driver GPDD 424 is further filtered by one or more filter criteria that are defined by the associated user. For example, the associated user might indicate that s/he only wants to see information about printing devices that are on a particular floor of a building, that support color, and that have a certain input bin size. Whichever printing information sets satisfy the filter criteria defined by the user will be part of a "UI GPDD" 426. The UI GPDD 426 for a particular user defines information on all connected printing devices that are available for the particular user. The UI GPDD 426 may be updated in real-time as the particular user makes selections about what characteristics or attributes a set of printing devices must have in order to be candidate printing devices for print jobs that are initiated by the particular user.

"Adding" a New Printing Device to a Printer Server

A printing device is "added" to a printer server when a printer server obtains details about the printing device, such as an address (e.g., IP or MAC) of the printing device, communication protocol(s) that the printing device supports, physical location of the printing device (e.g., building number, floor level), and set of features and options that the printing device supports.

Figure 5:
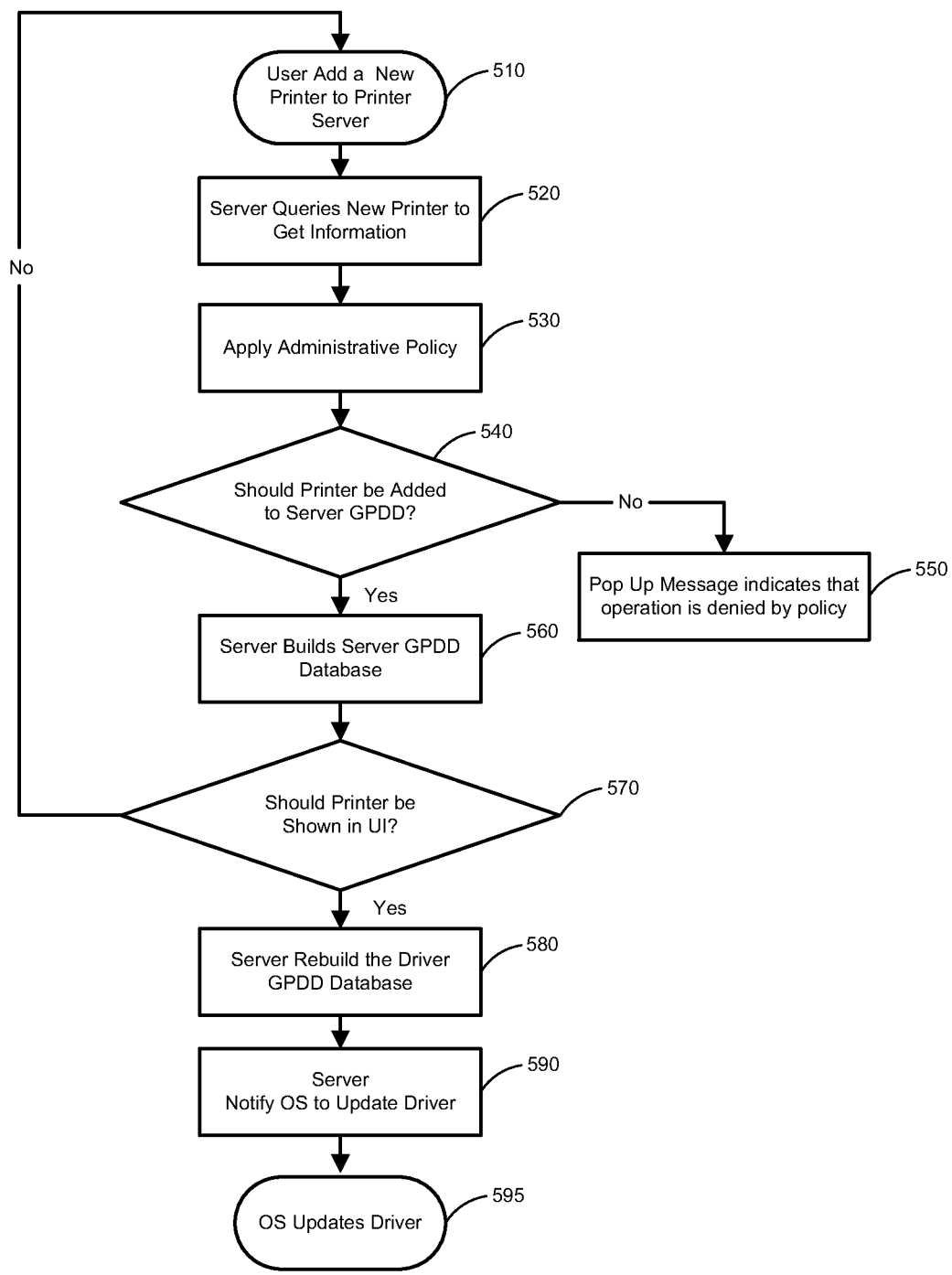
FIG. 5 is a flow diagram that depicts a process for adding a printing device to a printer server, according to an embodiment.

FIG. 5 is a flow diagram that depicts a process 500 for adding a connected printing device to a printer server, according to an embodiment. At step 510, a user provides, to printer server, input about a new printing device. Such input might include a network IP, an Internet IP or a MAC address of the printing device. The printing device may be local to (i.e., on the same network as) or remote to (i.e., not on the same network as) the printer server.

Alternatively, step 510 comprises the printer server automatically detecting the new printing device. Such automatic detection may be achieved in multiple ways. For example, upon the new printing device entering the network, the new printing device implements a Web Services Discovery specification by transmitting a HELLO multicast message to devices on the network. The printer server receives the HELLO message, responds with a message that identifies the printer server. If both the printer server and the new printing device implement a Web Services Metadata Exchange specification, then the printer server sends a metadata request message to the new printing device in order to retrieve information about how to request certain information about the new printing device, such as capabilities data.

At step 520, the printer server queries the new printing device for certain information, such as capabilities data of the printing device, any security protocols the printing device supports, etc.

At step 530, the printer server applies an administrative policy to at least some of the information retrieved from the printing device. The administrative policy indicates that the printing device must support a particular PDL (or page description language), the printing device appears on a pre-defined company list, and the printing device uses secure communication.

At step 540, the printer server determines, based on the administrative policy, whether the printing device should be added to the Server GPDD. If not, then process 500 proceeds to step 550, where the printer server causes a message to be displayed that indicates that the "add" operation is denied. If the printer server determines that the printing device should be added to the Server GPDD, then process 500 proceeds to step 560.

At step 560, the printer server builds the Server GPDD database. This step may comprise adding the retrieved information about the new printing device to the Server GPDD database.

At step 570, the printer server uses another policy to determine whether the new printing device should appear in a UI of a printer driver. The other policy may be defined by a driver administrator and determines whether a client device is able to "see" certain printing devices. If the result of step 570 is in the negative, then process 500 proceeds to a point prior to step 510, indicating that further input regarding a new printing device is required to proceed. If the result of step 570 is in the affirmative, then process 500 proceeds to step 580.

At step 580, the printer server rebuilds a Driver GPDD. This step may comprise adding the retrieved information about the new printing device to a Driver GPDD.

At step 590, the printer server sends the retrieved information to an operating system of a client device that executes a printer driver. At step 595, the operating system updates the printer driver based on the retrieved information. Alternatively, a user might decide to update the driver at a later time.

Creating User Interface Data

Figure 6:
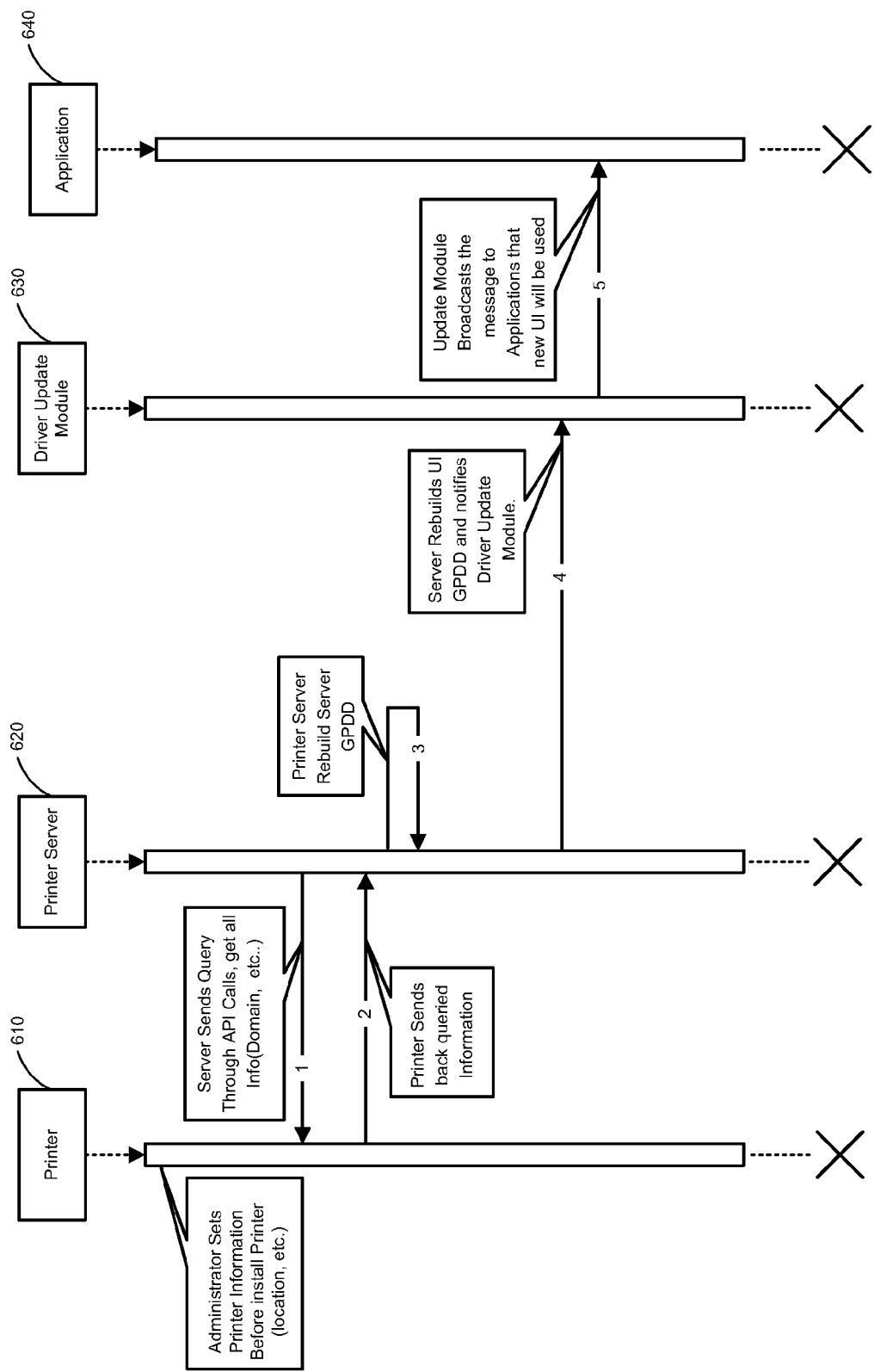
FIG. 6 is a sequence diagram that depicts a process for creating user interface data, according to an embodiment.

FIG. 6 is a sequence diagram that depicts a process 600 for creating user interface data, according to an embodiment. A printing device 610 receives, from an administrator, printer information. Such information might include a name of a company that owns printing device 610 and location of printing device 610, such as a building number, floor, section, department name, maintenance group name, etc. Such information might be received before printing device 610 is installed. Such information depends on user's input, not the device's native information. Also, such information may be received through a device control panel of printing device 610.

At step 1, a printer server 620 sends one or more queries to printing device 610 in order to receive information about printing device 610, including capabilities of printing device 610. One or more techniques may be used to send the one or more queries, including, but not limited to, a WS Discovery query, OS network API, SNMP query, etc.

At step 2, printing device 610 sends, to printer server 620, the information that printer server 620 requested.

At step 3, printer server 620 checks one or more company or domain administrative policies and builds (or rebuilds) a Server GPDD based on the retrieved information.

At step 4, printer server 620 checks a user policy and builds (or rebuilds), based on the retrieved information, a Driver GPDD for each user that is authorized to use printing device 610.

At step 5, printer server 620 sends the retrieved information to the OS about updating each printer driver user that is authorized to use the printing device. The OS, in turn, notifies a driver update module 630 that is part of the printer driver. Driver update module 630 updates the driver's UI data. If a driver UI module of the printer driver is already processing a job, then driver update module 630 might include adequate solutions to ensure that the new UI update does not affect existing print jobs.

At step 6, driver update module 630 might broadcast, to one or more applications 640 executing on the client device, a message that a new UI will be used. For some printing applications, it is important to inform the user that one or more printer properties have changed, such as when a staple unit is removed. A user should be notified to avoid sending print jobs that require the staple unit.

Querying a New Printing Device

Figure 7:
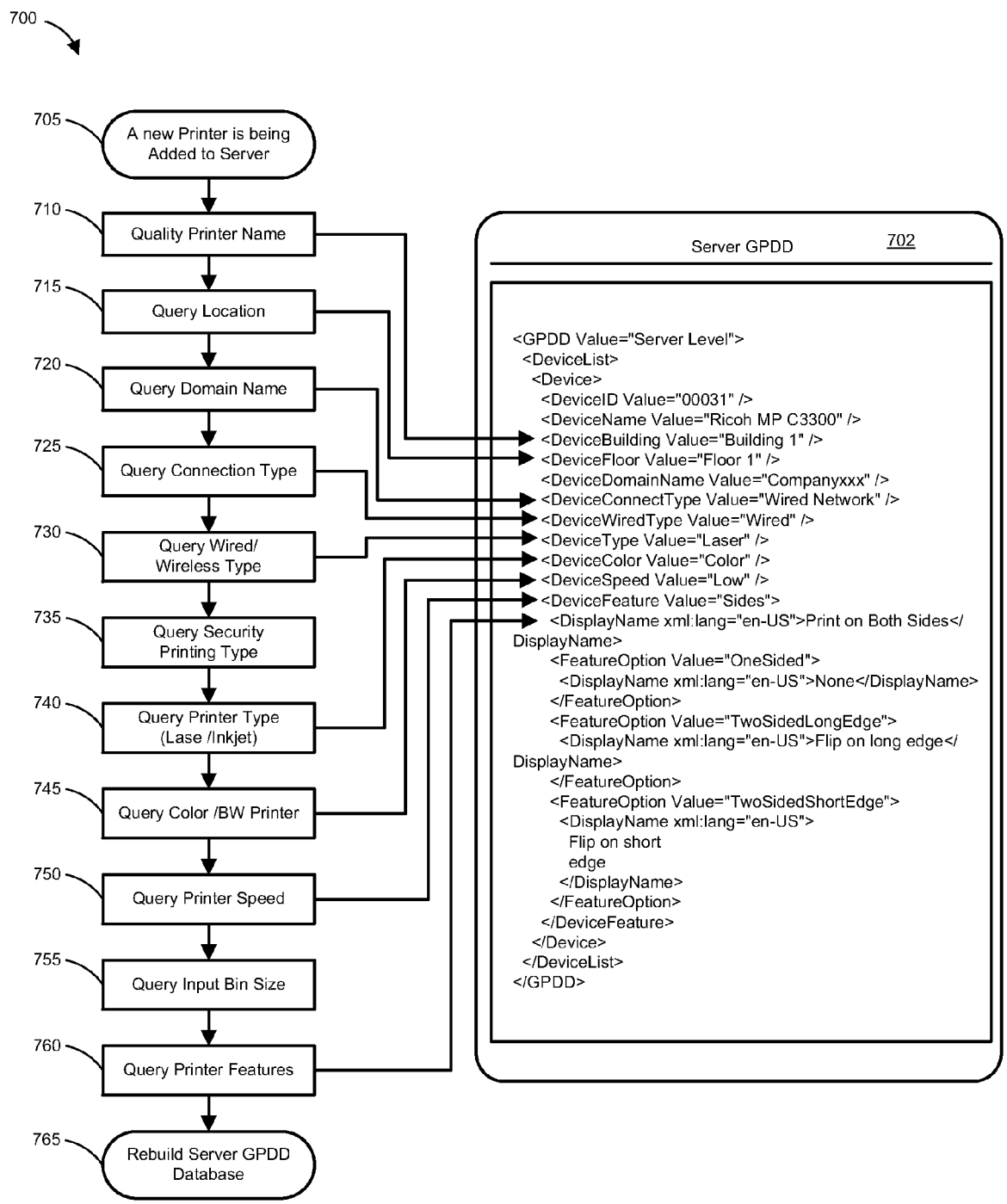
FIG. 7 includes a flow diagram and a block diagram that depict a process for querying a new printing device that is being added to a printer server, according to an embodiment.

FIG. 7 includes a flow diagram and a block diagram that depict a process 700 for querying a new printing device that is being added to a printer server, such as printer server 110, according to an embodiment.

At step 705, a new printing device is added to a printer server. The new printing device may have been discovered automatically by the printer server or a network administrator might have informed the printer server about the new printing device, such as an IP or MAC address of the new printing device.

At step 710, the printer server queries the new printing device for a name to be used for the printing device. As indicated in Server GPDD 702, a name for the new printing device is "Ricoh MP C3300."

At step 715, the printer server queries the new printing device for a location, such as building number and floor number. As indicated in Server GPDD 702, the new printing device is on "Floor 1" of "Building 1."

At step 720, the printer server queries the new printing device for a domain name. As indicated in Server GPDD 702, the name of the domain of the new printing device is "Companyxxx."

At step 725, the printer server queries the new printing device for a type of connection of the new printing device to the printer server. As indicated in Server GPDD 702, the connection type is a wired network.

At step 730, the printer server queries the new printing device for wired or wireless type. As indicated in Server GPDD 702, the new printing device is wired.

At step 735, the printer server queries the new printing device for a type of printing security supported by the new printing device. In this example, the security printing type is not reflected in Server GPDD 702.

At step 740, the printer server queries the new printing device for the device's type, such as whether the new printing device is a laser printer or an inkjet printer. As indicated in Server GPDD 702, the new printing device is a laser printer.

At step 745, the printer server queries the new printing device for whether the new printing device supports color or just black and white. As indicated in Server GPDD 702, the new printing device is a color printer.

At step 750, the printer server queries the new printing device for the printer's speed. As indicated in Server GPDD 702, the new printing device is "Low." Other possible values for speed might be "High" or "Medium" or may be a metric that reflects a speed, such as "100 sheets per minute."

At step 755, the printer server queries the new printing device for input bin size, which, in this example, is not reflected in Server GPDD 702.

At step 760, the printer server queries the new printing device for one or more printer features. As indicated in Server GPDD 702, one feature of the new printing device is "Sides" whose display name is "Print on Both Sides." Also indicated in Server GPDD 702 is the fact that the "Sides" feature has three options: "OneSided", "TwoSidedLongEdge", and "TwoSidedShortEdge". Each of the three options is associated with a corresponding display name, such as "None", "Flip on long edge" and "Flip on short edge".

At step 765, the printer server builds (or rebuilds) Server GPDD 702 to indicate the information that is retrieved in steps 710-760.

Data Flow Generic Printer Description Data

Figure 8:
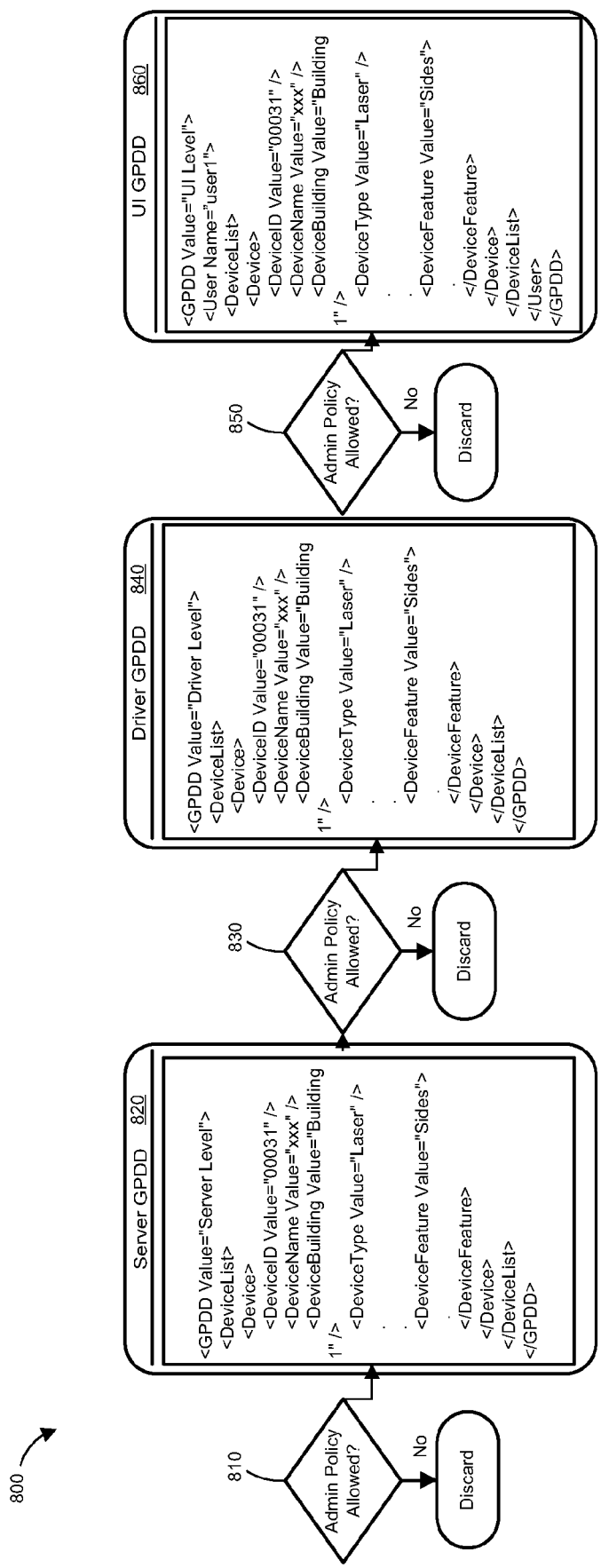
FIG. 8 is a block diagram that depicts a data flow of generic printer description data (GPDD) after querying a new printing device, according to an embodiment.

FIG. 8 is a block diagram that depicts a data flow 800 of generic printer description data (GPDD) after querying a new printing device, according to an embodiment. After retrieving information about a new printing device (such as the information retrieved in steps 710-760 described above), a printer server (e.g., printer server 110 in FIG. 1) performs a check 810. Check 810 involves determining whether an administrative policy allows the new printing device to be added to a Server GPDD 820. This check may be performed prior to receiving all information about the new printing device, such as specific features and options. For example, after determining that a new printing device does not support any secured printing, then the printer server might not query the new printing device for information about supported features and options.

If check 810 results in the negative, then information about the new printing device is discarded. If the check 810 results in the affirmative, then information about the new printing device is added to Server GPDD 820. As indicated in FIG. 8, Server GPDD 820 includes a GPDD tag that indicates a GPDD value, which is "Server Level" indicating a server GPDD.

The printer server then performs check 830, which involves determining whether an administrative policy allows the new printing device to be added to a Driver GPDD 840, which corresponds to a particular user or a particular client device that is registered with the printer server. As indicated in FIG. 8, Driver GPDD 840 includes a GPDD tag that indicates a GPDD value, which is "Driver Level" indicating a driver GPDD. If check 830 results in the negative, then information about the new printing device is not added to Driver GPDD. If check 830 results in the affirmative, then information about the new printing device is added to Driver GPDD 840. As indicated in FIG. 8, Driver GPDD 840 includes a GPDD tag that indicates a GPDD value, which is "Driver Level" indicating a driver GPDD.

The printer server may perform check 830 for each user that is registered with the printer server or for each client device that is registered with the printer server and, optionally, that includes an integrated printer driver.

If check 830 results in the affirmative, then the printer server sends the information about the new printing device to the client device that is associated with Driver GPDD 840. The printer driver executing on that client device performs check 850, which involves determining whether the new printing device is to be added to a list of available printing devices for the client device. If check 850 results in the negative, then a UI GPDD on the client device is not updated. If check 850 results in the affirmative, then the printer driver updates UI GPDD 860 to include information about the new printing device. As indicated in FIG. 8, UI GPDD 860 includes a GPDD tag that indicates a GPDD value, which is "UI Level" indicating a UI GPDD. Also, UI GPDD 860 includes a user tag that indicates a name value, which is "user1" in this example.

Multiple Versions of GPDD

Figure 9:
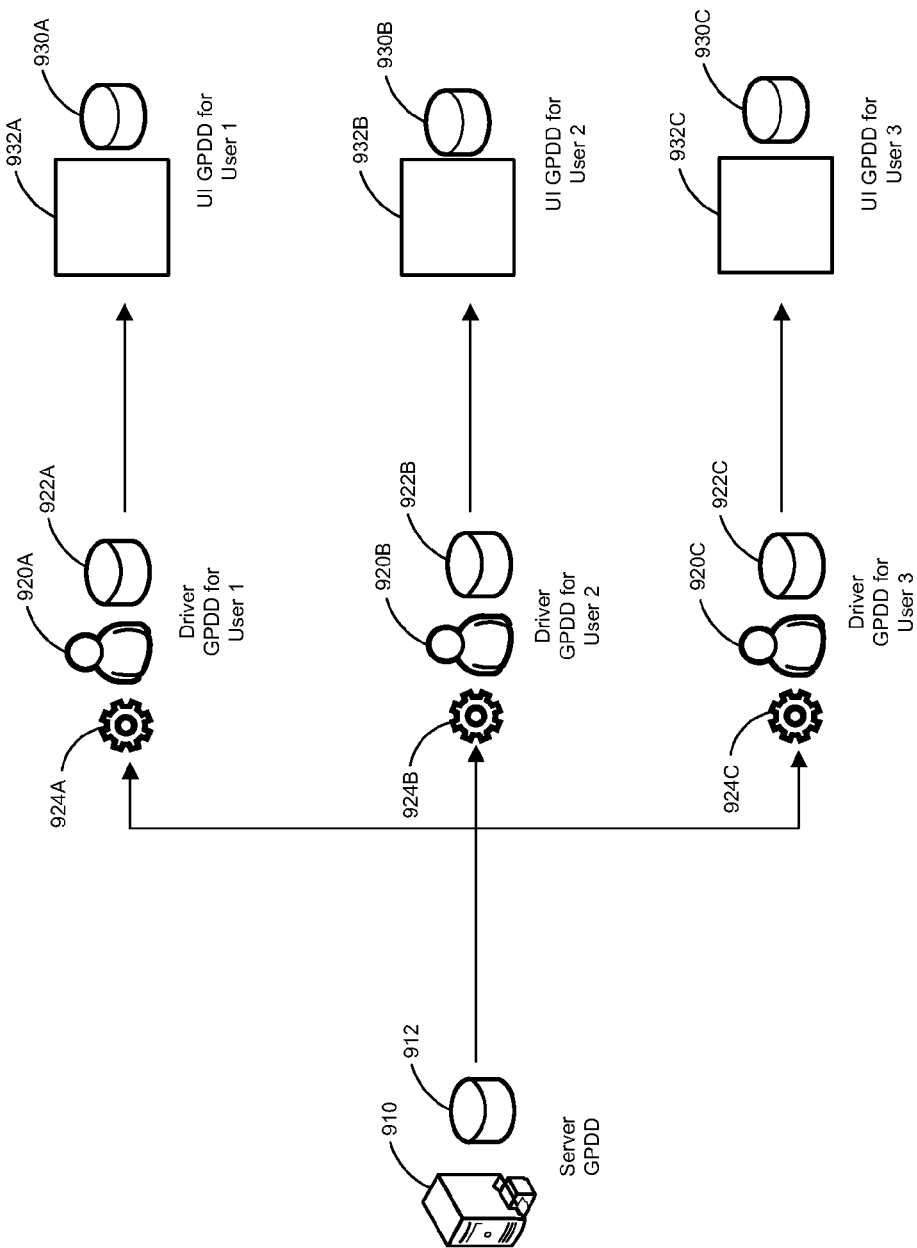
FIG. 9 is a block diagram that depicts multiple versions of generic printer description data in integrated feature selection printer drivers, according to an embodiment.

FIG. 9 is a block diagram that depicts multiple versions of generic printer description data in integrated feature selection printer drivers, according to an embodiment. FIG. 9 depicts a printer server 910 and a Server GPDD database 912. Printer server 910 generates, based on Server GPDD in database 912, a Driver GPDD and an integrated printer driver for each registered user 920A-C. For example, Driver GPDD 922A and integrated printer driver 924A is generated for user 920A; Driver GPDD 922B and integrated printer driver 924B is generated for user 920B; and so forth. Each of Driver GPDD 922A-C is a subset of the Server GPDD stored in database 912.

Based on the Driver GPDD received at the corresponding client device, a printer driver generates a UI GPDD. For example, printer driver 924A generates UI GPDD 930A based on Driver GPDD 922A, printer driver 924B generates UI GPDD 930B based on Driver GPDD 922B, and so forth. Thus, each UI GPDD is a subset of its corresponding Driver GPDD.

From its UI GPDD, a printer driver generates a user interface on a display of a client device. For example, printer driver 924A generates UI 932A based on UI GPDD 930A, printer driver 924B generates UI 932B based on UI GPDD 930B, and so forth.

Example GPDD

FIG. 10 is a block diagram that depicts example generic printer description data for each of a server, a driver, and a user interface, according to an embodiment. FIG. 10 depicts an example Server GPDD 1010, an example Driver GPDD 1020, and an example UI GPDD 1030. Although GPDDs 1010-1030 are in an XML format, embodiments of the invention are not limited to GPDDs in an XML format. Alternative formats are possible.

In this example, each of GPDDs 1010-1030 include the same information of a printing device, such as attributes of the printing device (e.g., name, location, connection type, device type, etc.) and capabilities data that includes options for the feature "Sides." Also, each of GPDDs 1010-1030 includes a different value for the GPDD Value. Specifically, Server GPDD 1010 indicates "Server level" as the value for the GPDD Value, Driver GPDD 1020 indicates "Driver level" as the value for the GPDD Value, and UI GPDD 1030 indicates "UI level" as the value for the GPDD Value.

Printer Selection Preference Menu

Figure 11:
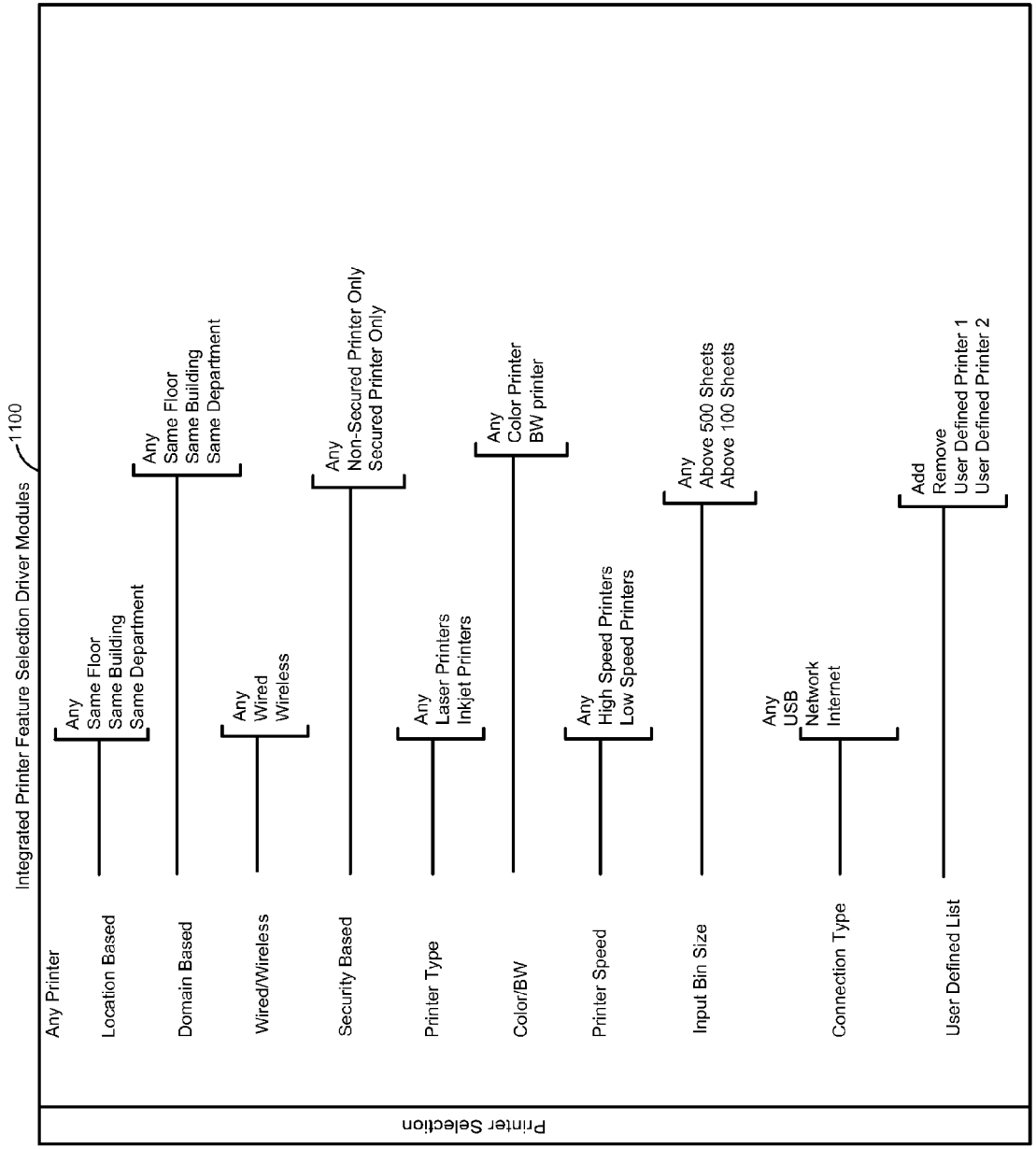
FIG. 11 is a block diagram that depicts a printer selection preference menu, according to an embodiment.

FIG. 11 is a block diagram that depicts a printer selection preference menu 1100, according to an embodiment. A printer driver (e.g., integrated printer driver 112) might generate a display that is based on selections of one or more preferences indicated in menu 1100. Menu 1100 indicates possible attributes or characteristics of printing devices. Menu 1100 allows a user to select different attributes that a set of target printing devices must have in order to be a candidate printing device to process future print jobs.

In this example, menu 1100 indicates possible locations of a printing device, possible domains of a printing device, whether a printing device is wired or wireless, whether a printing device is secured or not, whether a printing device is a laser or inkjet printer, whether a printing device supports color or just black and white, whether the printing device is a high speed or a low speed printer, whether a printing device supports an input bin size of 500 sheets or just 100 sheets, possible connection types of a printing device, and an option to be on a user defined list.

Initially, menu 1100 might include default selections, such as "Any" for each attribute/preference. Once a user is finished making any selections, the final set of selected attributes/preferences are used to determine which printing devices may be used to process print jobs. A printer driver might use the selections to build (or rebuild) a UI GPDD that indicates a set of features and options that are supported by printing devices that satisfy the preference selections indicated in menu 1100. A UI module of the printer driver might generate a user interface based on the UI GPDD.

Changing a Selection Filter Preference

Figure 12:
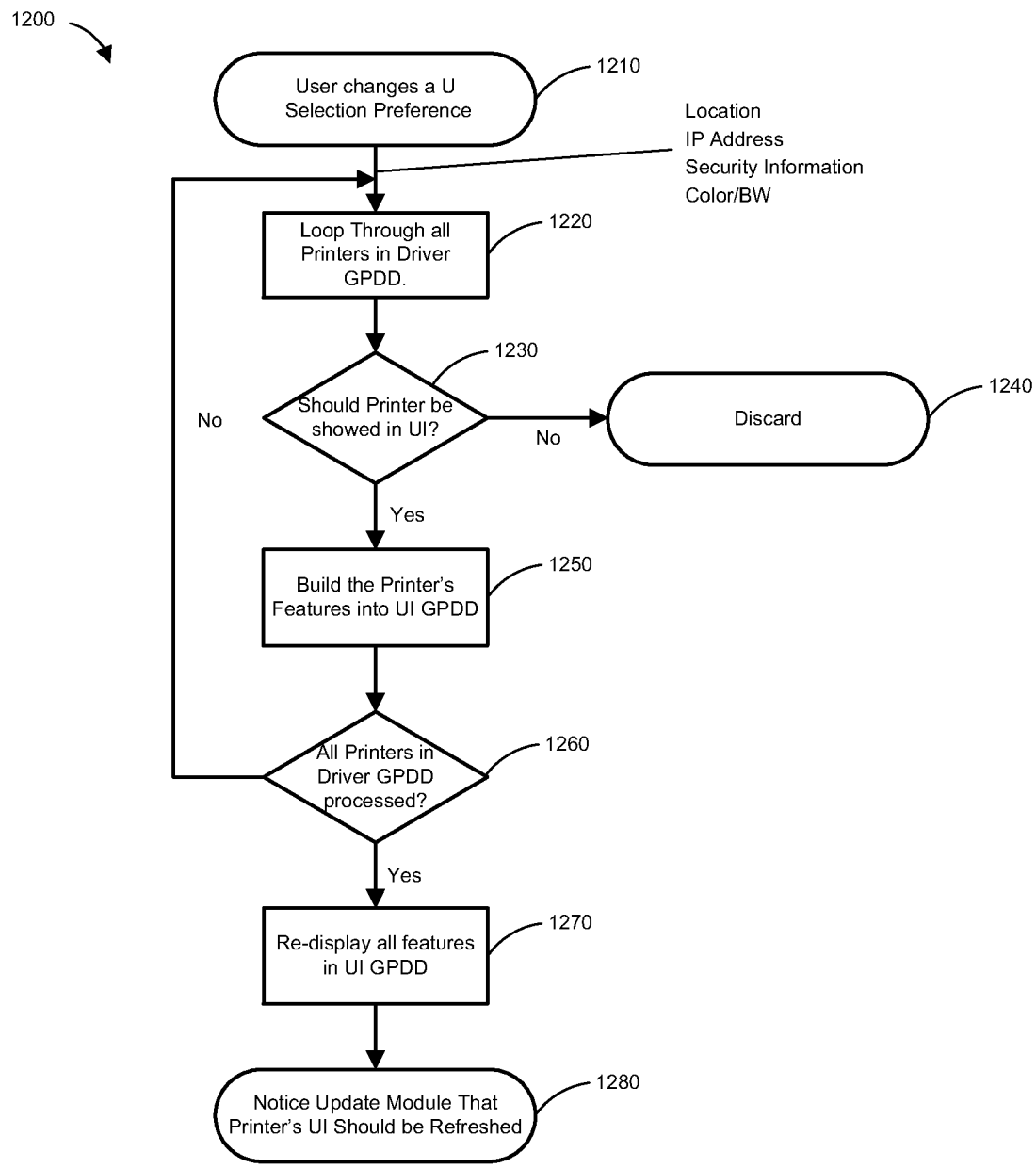
FIG. 12 is a flow diagram that depicts a process for a user changing a filter preference, according to an embodiment.

FIG. 12 is a flow diagram that depicts a process 1200 for a user changing a filter preference, according to an embodiment. Process 1200 may be performed by one or more components or modules of a printer driver, such as driver update module 334 depicted in FIG. 3.

At step 1210, a user changes a UI selection preference. Examples of UI selection preferences include, but are not limited to, location (e.g., building number or floor number), IP address (e.g., a specific subnet), security information, and color or black/white. The user might change the UI selection preference through a UI generated by a printer driver. As a result of performing step 1210, the printer driver might delete all UI GPDD and rebuild it using the following process. Alternatively, the printer driver might delete, from a UI GPDD one at a time, only information about a printing device that the printer driver determines should not be included in the UI GPDD based on the user's selection preference.

At step 1220, the printer driver identifies a printing device indicated in a Driver GPDD to which the printer driver has access. The Driver GPDD may be stored on the same client device that executes the printer driver.

At step 1230, the printer driver determines whether the printing device identified in step 1220 should be displayed in a user interface that a user uses to select features and options for a particular print job. This determination may be made by comparing the current set of selection preferences with attributes/characteristics of the identified printing device or by comparing just the changed preference with such attributes/characteristics. If step 1230 results in the negative, then process 1200 proceeds to step 1240, where information about the identified printing device is not included in (e.g., deleted from) the UI GPDD. If step 1230 results in the affirmative, then process 1200 proceeds to step 1250.

At step 1250, the printer driver adds the printing device's capabilities (i.e., features and options) into a UI GPDD, from which the printer driver eventually generates a user interface.

At step 1260, the printer driver determines whether information about each printing device indicated in the Driver GPDD has been analyzed. If not, then process 1200 proceeds to step 1220. Otherwise, process 1200 proceeds to step 1270.

At step 1270, the printer driver causes all (or many) features and options indicated in the updated UI GPDD to be re-displayed on the client. Only the features and options of printing devices that are identified in the UI GPDD are displayed. Thus, information about any printing devices that were not included in the UI GPDD in step 1250 is not displayed to a user of a client device that executes the printer driver.

At step 1280, one or more applications that are currently using this printer driver are notified, e.g., by the printer driver.

Changing UI Feature/Option

The selection of features and options under an integrated printer driver approach is different compared to other printer drivers. To support multiple devices in one user interface, the integrated printer driver should ensure that every feature set selection by a user is supported by at least one printing device. Constraints to features are applied according to device support by any devices. In other words, if none of the printing devices indicated in a UI GPDD supports a particular feature, then that particular feature appears disabled.

Figure 13:
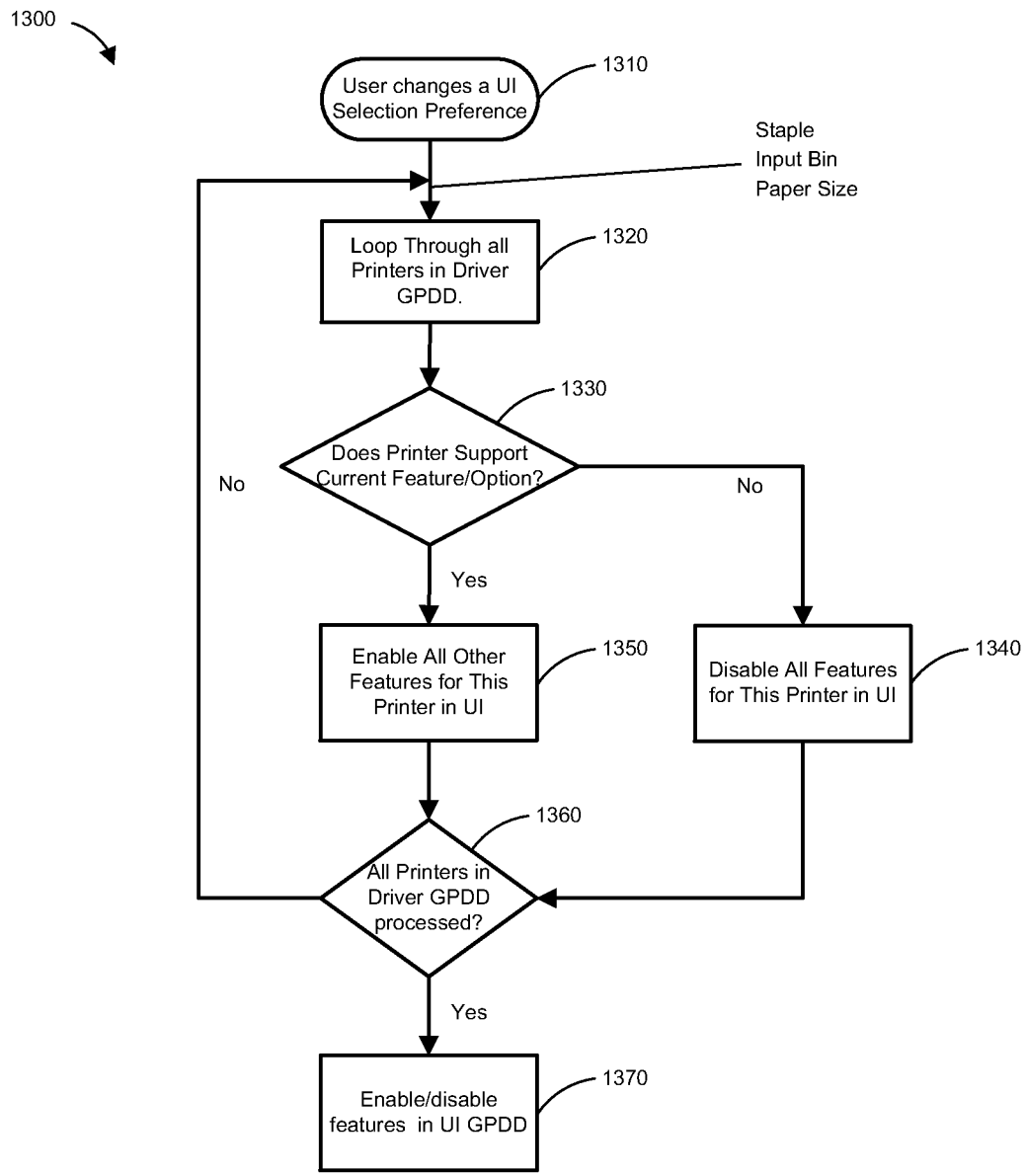
FIG. 13 is a flow diagram that depicts a process for a user changing a feature/option on a user interface (UI) of a printer driver, according to an embodiment.

FIG. 13 is a flow diagram that depicts a process 1300 for a user changing a feature/option on a user interface (UI) of a printer driver, according to an embodiment.

At step 1310, the UI receives, from a user, input that indicates a change in a feature or option. Examples of a change include changing the paper size from 8.5×11 to A4, or changing the input bin, or requiring stapling.

At step 1320, the printer driver identifies a printing device indicated in a Driver GPDD. If there are more than one printing device identified in the Driver GPDD, then the printer driver might "loop through" each identified printing device. In other words, steps 1320-1360 will be performed for each identified printing device.

At step 1330, the printer driver determines whether the printing device identified in step 1320 supports the feature/option selected in step 1310. If not, then process 1300 proceeds to step 1340. If so, then process 1300 proceeds to step 1350.

At step 1340, the printer driver disables all features of the printing device identified in step 1320 if the printing device does not support the feature/option set previously selected by user.

At step 1350, the printer driver enables all features for this printing device in the UI if the feature set previously selected by user is supported by the printing device.

At step 1360, the printer driver determines whether all printing devices have been identified in the Driver GPDD. If not, then process 1300 proceeds to step 1320 to identify another printing device. Otherwise, process 1300 proceeds to step 1370.

At step 1370, for each feature enabled/disabled in the UI, the printer driver enables or disables that feature in a UI GPDD. Thus, if feature 1 is enabled in the UI, then the printer driver enables feature 1 in the UI GPDD. Conversely, if feature 2 is disabled in the UI, then the printer driver disables feature 2 in the UI GPDD.

Confirm UI Selection

Figure 14:
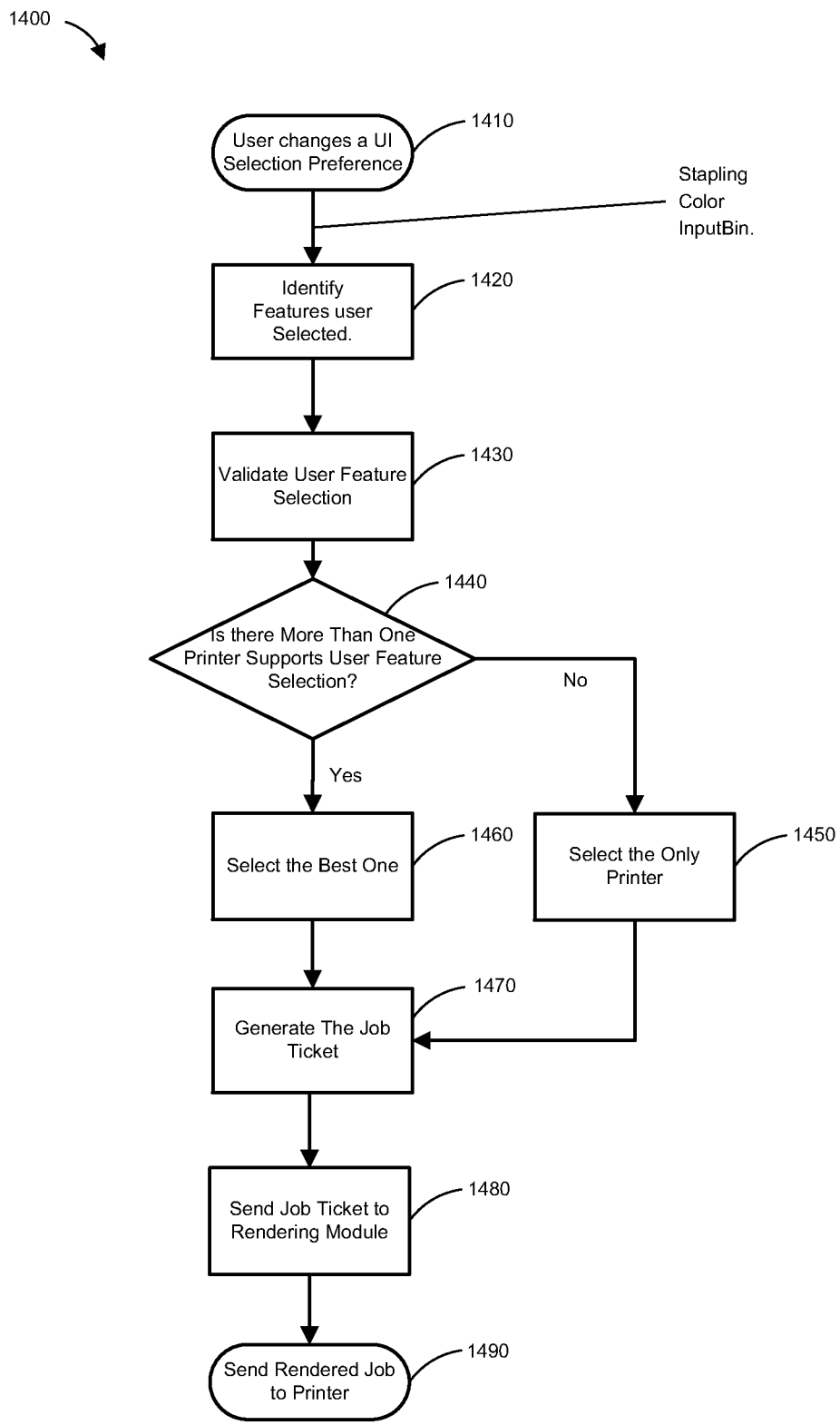
FIG. 14 is a flow diagram that depicts a process for validating user selections of features of options, according to an embodiment.

FIG. 14 is a flow diagram that depicts a process 1400 for validating user selections of features of options, according to an embodiment. Process 1400 may be performed by a printer driver, such as integrated printer driver 112.

At step 1410, a printer driver receives, from a user, input that indicates confirmation of the features and options selected for a print job, such as that stapling is required, color ink is required, and that a certain input bin size is required. The input may be the user selecting an "OK" or "Print" button. This step may be performed by a UI module of the printer driver, such as UI module 332 of printer driver 330 of FIG. 3.

At step 1420, the printer driver identifies all features and options that are selected for the print job. Some of the features and options may have been selected by the user while other features and options may have been default selections. Such default selections may have been established in code of the printer driver and/or established by the user in a previous print session. For example, a prior print job includes a set of features and options and those features and options are default selections (as indicated in the driver's UI) for the current print job, i.e., before the user has viewed the UI.

At step 1430, the printer driver validates the selected features and options of the print job. For example, if a user defines a page margin that is larger than a page size, then the printer driver may inform the user to change the value before printing.

At step 1440, the printer driver determines whether more than one printing device supports the set of selected features and options. If not, then at step 1450, the printer driver selects the one printing device. Otherwise, process 1400 proceeds to step 1460.

At step 1460, the printer driver selects a particular printing device among the multiple printing devices that are capable of processing the print job according to the selected set of features and options. This selection may be based on determining which of the multiple printing devices are closest to the client device upon which the printer driver is executing. Alternatively, this selection may be based on other factors, such as which printing device is newer, or which printing device is the latest model, or which printing device produces higher quality prints.

At step 1470, the printer driver generates a print job ticket based on the selected features and options.

At step 1480, the printer driver sends the print job ticket to a rendering module of the printer driver, such as rendering module 336 of printer driver 330 of FIG. 3. The rendering module may be implemented as a single module or as multiple modules that each might perform a different type of rendering. Like step 1410, steps 1420-1480 may be performed by a UI module of the printer driver, such as UI module 332 of printer driver 330 of FIG. 3. The rendering module converts (1) document data received from and generated by an application (e.g., a Microsoft Word) executing on the client device into (2) print data that the printing device is configured to be able to process. The printer driver might automatically detect the PDL supported by the destination printing device and render the job accordingly. For example, the printer driver might identify an appropriate sub-module that is configured to perform the rendering that is appropriate for the destination printing device and cause that sub-module to process the document data to produce the print data in the appropriate format. As another example, the rendering module of the printer driver might render the print job into a universal format, such as a Bitmap image.

At step 1490, the printer driver sends the print job, which includes the job ticket and the rendered print data, to the printing device selected in step 1450 or step 1460. This step may be performed by a port management module of the printer drive, such as integrated printer port management module 338 of FIG. 3.

Job Ticket Creation

Figure 15:
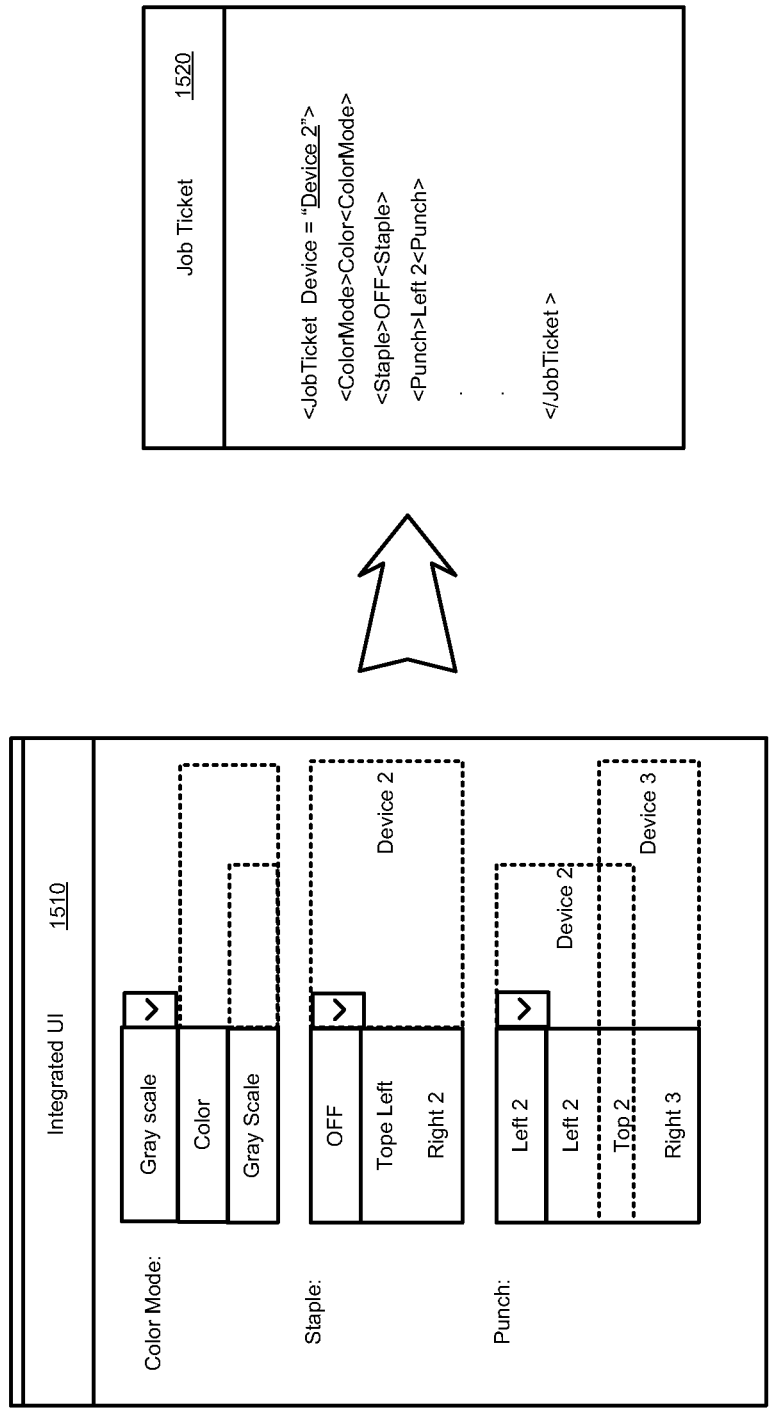
FIG. 15 is a block diagram that depicts a job ticket that is generated from an integrated user interface (UI), according to an embodiment.

FIG. 15 is a block diagram that depicts a job ticket 1520 that is generated from an integrated user interface (UI) 1510, according to an embodiment. Integrated UI 1510 is not necessarily what a user sees. Rather, integrated UI 1510 is a conceptual representation of different features and options that a user selected and of what printing devices support those features and options. For example, integrated UI 1510 indicates three features: Color Mode, Staple, and Punch. The options for Color Mode are "Color" and "Gray Scale" where "Gray Scale" is selected (whether affirmatively selected by a user or a default selection). The options for Staple are "OFF", "Top Left", and "Right 2" where "OFF" is selected. The options for Punch are "Left 2", "Top 2", and "Right 3" where "Left 2" is selected.

Integrated UI 1510 further indicates, for the "Color Mode" feature, that Printing Device 1 supports options "Color" and "Gray Scale" and that Printing Device 2 supports only the "Gray Scale" option. Integrated UI 1510 indicates that Printing Device 2 supports the "Staple" feature. For the "Punch" feature, integrated UI 1510 indicates that Printing Device 2 supports options "Left 2" and "Top 2" and that Printing Device 3 supports options "Top 2" and "Right 3."

As indicated in integrated UI 1510, only Printing Device 2 supports all the selected features and options. Based on the options and features selected, the printer driver generates job ticket 1520. In this example, job ticket 1520 is an XML file that includes an element or tag for each selected feature where the root element identifies a printing device. In this example, the value of the attribute "Device" in the "Job Ticket" element is "Device 2", referring to Printing Device 2. The resulting print job will thus be sent to Printing Device 2. Also, there are three elements: "ColorMode", "Staple", and "Punch."

The value of each element indicates the selected option for the corresponding feature. In this example, the value of the "ColorMode" element is "Gray Scale", the value of the "Staple" element is "OFF", and the value of the "Punch" element is "Left 2".

Example Printer Driver User Interface

FIG. 16 is a block diagram that depicts an example user interface 1600, according to an embodiment. User interface 1600 may be generated by a UI module of a printer driver. The data used to populate user interface 1600 may originate from a UI GPDD.

User interface 1600 comprises three parts or regions: printer selection filter preference 1610, a printer collection list 1620, and a printer feature/option list 1630.

Printer selection filter preference 1610 defines printer preferences (e.g., those indicated in menu 1100) that are used to exclude some printers that a user does not intend to print upon. For example, a user may select Color/BW as a filter, and define only Black/White printers as possible destination devices. In the depicted example, the printer preferences are that the printing device must be non-secured, the printing device must support color printing, that the input bin size must be greater than 500 sheets, and the connection type is network.

Printer collection list 1620 lists one or more (or all) printing devices that are within a set of possible destination printing devices after the user's preferences are defined in printer selection filter preference 1610. In the depicted example, three printing devices are in printer collection list 1620: Ricoh Aficio MP 3500 PCL6, Ricoh Aficio MP C3500 PCL6, and Ricoh Aficio SP 8200DN PCL6.

Printer feature/option list 1630 lists multiple (or all) features and options supported by a set of one or more printing devices that are determined based on a set of selection preferences selected by a user (and/or by default). In an embodiment, each time a user changes a feature or option from printer feature/option list 1620, the resulting set of features is validated by a printer driver against the capabilities of potential printing devices (e.g., those indicated in a Driver GPDD). If a printing device does not support the resulting set of features, then all of that printing device's features are disabled in printer feature/option list 1630. However, if there is a printing device that does support the resulting set of features, then all of that printing device's features are enabled in printer feature/option list 1630.

In this example, printer feature/option list 1630 divides printer features into three main types: Paper/Output, Graphic, and Document Options, which include the majority of the printer features, such as Slip Sheet, Output Bin, Staple, Punch, Edge to Edge Print, Print Density, and Print Quality.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 17:
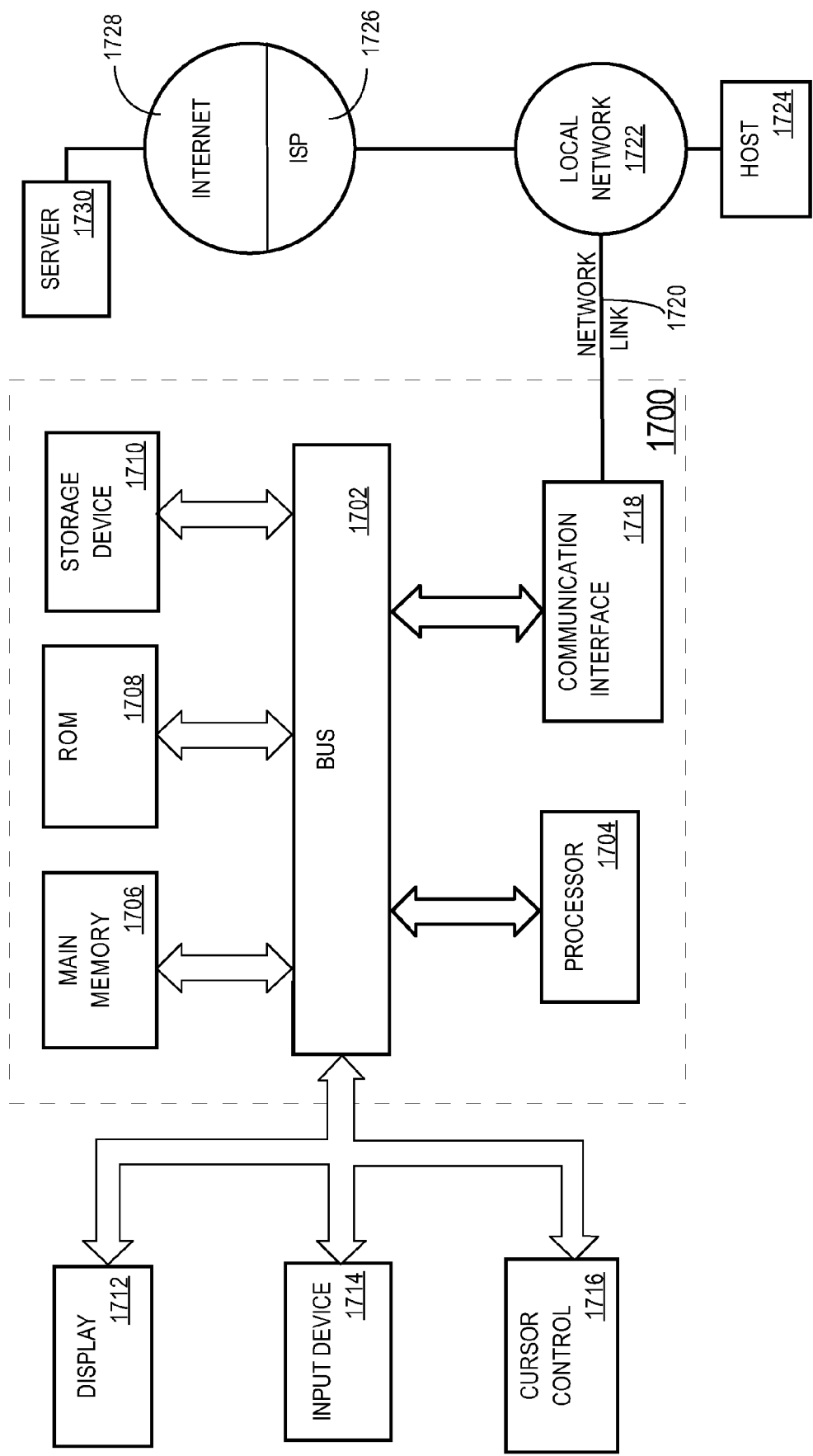
FIG. 17 is a block diagram that illustrates a computer system upon which an embodiment of the invention may be implemented.

For example, FIG. 17 is a block diagram that illustrates a computer system 1700 upon which an embodiment of the invention may be implemented. Computer system 1700 includes a bus 1702 or other communication mechanism for communicating information, and a hardware processor 1704 coupled with bus 1702 for processing information. Hardware processor 1704 may be, for example, a general purpose microprocessor.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, render computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, such as a magnetic disk or optical disk, is provided and coupled to bus 1702 for storing information and instructions.

Computer system 1700 may be coupled via bus 1702 to a display 1712, such as a cathode ray tube (CRT), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1710. Volatile media includes dynamic memory, such as main memory 1706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory storage media storing instructions which, when executed by one or more computing devices, cause:

receiving, at a client device, print feature and option data that include features and options supported by a plurality of printing devices;

generating, by a printer driver executing on the client device, a user interface based on the print feature and option data, wherein the user interface indicates the features and options supported by the plurality of printing devices;

receiving, from a user through the user interface, input that selects one or more features and options reflected in the print feature and option data;

based on the input, the printer driver executing on the client device:
   selecting a particular printing device from among the plurality of printing devices, and
   generating a print job;

causing, by the printer driver executing on the client device, the print job to be sent to the particular printing device;

after causing the print job to be sent to the particular printing device, receiving, at the client device, from a network device, update data that indicates an update to a feature or an option supported by a printing device of the plurality of printing devices;

in response to receiving the update data, updating, at the client device, the print feature and option data based on the update data to generate updated print feature and option data;

after updating the print feature and option data at the client device, generating, by the printer driver executing on the client device a second user interface based on the updated print feature and option data, wherein the second user interface indicates the features and options supported by the plurality of printing devices;

receiving, from a second user through the second user interface, second input that selects one or more second features and options reflected in the feature and option data;

based on the second input, the printer driver executing on the client device:
   selecting a second printing device from among the plurality of printing devices, and
   generating a second print job;

causing, by the printer driver executing on the client device, the second print job to be sent to the second printing device.

2. The one or more non-transitory storage media of claim 1, wherein the print feature and option data is received from a printer server that is separate from the client device and that receives the print feature and option data from the plurality of printing devices.

3. The one or more non-transitory storage media of claim 1, wherein the instructions, when executed by the one or more processors, further cause:
   receiving second input that indicates user selection of one or more preferences;
   based on the second input, identifying a current set of selected preferences that is different than a prior set of selected preferences that reflect a set of selected preferences that existed prior to receiving the second input;
   identifying a current set of one or more printing devices that support the current set of selected preferences, wherein the current set of one or more printing devices is different than a prior set of one or more printing devices that support the prior set of selected preferences.

4. The one or more non-transitory storage media of claim 3, wherein the one or more preferences indicate one or more of the following: a particular location of a certain printing device, whether the certain printing device is wired or wireless, whether the certain printing device is secured or not secured, a type of printing device, whether the certain printing device supports color or only black and white, a speed of the certain printing device, an input bin size of the certain printing device, or a type of connection of the certain printing device.

5. The one or more non-transitory storage media of claim 3, wherein the instructions, when executed by the one or more processors, further cause:
   after identifying the current set of one or more printing devices, displaying, through the user interface, information about each printing device in the current set of one or more printing devices.

6. The one or more non-transitory storage media of claim 3, wherein the current set of one or more printing devices comprises multiple printing devices, wherein the instructions, when executed by the one or more processors, further cause:
   for each printing device in the current set of one or more printing devices:
      identifying a particular set of features of options that said each printing device supports;
      updating the user interface to indicate the particular set of features and options, wherein prior to receiving the second input, the user interface indicated a previous set of features and options that is different than the particular set of features and options.

7. The one or more non-transitory storage media of claim 1, wherein:
   receiving the print feature and option data comprises receiving, at the client device, a software package that includes executable code that, when executed, causes the client device to generate the printer driver; and
   the software package also includes the print feature and option data.

8. The one or more non-transitory storage media of claim 1, wherein the instructions, which executed by one or more processors, further cause:
   prior to receiving the print feature and option data, executing the printer driver at the client device; and
   in response to receiving the print feature and option data, causing the printer driver to be updated to include the print feature and option data.

9. The one or more non-transitory storage media of claim 1, wherein the instructions, which executed by one or more processors, further cause:
   receiving and storing, at the client device, driver generic printer description data (GPDD) that includes information about features and options supported by multiple printing devices;
   generating, based on the driver GPDD, at the client device, user interface GPDD that includes information about features and options supported by a subset of the multiple printing devices, wherein the user interface GPDD is a subset of the driver GPDD.

10. The one or more non-transitory storage media of claim 1, wherein:
   the printer driver comprises an integrated user interface module that is configured to generate the user interface, a driver update module that is configured to update the printer driver, and one or more rendering modules that are configured to generate print jobs based on selected features and options.

11. One or more non-transitory storage media storing instructions which, when executed by one or more processors, cause:

receiving, at a printer server, from a first printing device, first print feature and option data that indicates features and options supported by the first printing device;

receiving, at the printer server, from a second printing device that is different than the first printing device, second print feature and option data that indicates features and options supported by the second printing device;

generating, at the printer server, a printer driver that includes the first and second print feature and option data; and sending, to a client device, the printer driver that includes the first and second print feature and option data, wherein after sending the first and second print feature and option data to the client device, the client device installs and executes the printer driver that includes the first and second print feature and option data and is configured to send print jobs to the first and second printing devices.

12. The one or more non-transitory storage media of claim 11, wherein:
prior to sending the first and second print feature and option data to the client device:
the client device executes the printer driver, and
the printer driver does not include the first and second print feature and option data; and
after sending the first and second print feature and option data to the client device, the printer driver is updated to include the first and second print feature and option data.

13. The one or more non-transitory storage media of claim 11, wherein generating and sending the printer driver are performed without receiving a request for features and options from the client device.

14. The one or more non-transitory storage media of claim 11, wherein the printer driver generates a user interface based on the first and second print feature and option data.

15. The one or more non-transitory storage media of claim 11, wherein the second printing device supports a feature that the first printing device does not support.

16. The one or more non-transitory storage media of claim 11, wherein the instructions, when executed by the one or more processors, further cause, prior to sending the first and second print feature and option data to the client device:
reading policy data from storage of the printer server;
applying one or more criteria indicated in the policy data to one or more attributes of the first printing device and to one or more attributes of the second printing device;
wherein the one or more attributes of the first printing device and of the second printing device must satisfy the one or more criteria indicated in the policy data in order for the first and second print feature and option data to be sent to the client device.

17. The one or more non-transitory storage media of claim 16, wherein:
the policy data is first policy data;
the instructions, when executed by the one or more processors, further cause:
storing second policy data that is different than the first policy data, wherein the second policy data is associated with a first client device;
storing third policy data that is different than the first and second policy data, wherein the third policy data is associated with a second client device that is different than the first client device;
applying one or more criteria indicated in the second policy data to one or more attributes of the first printing device;
wherein the one or more attributes of the first printing device must satisfy the one or more criteria indicated in the second policy data in order for the first print feature and option data to be sent to the first client device;
applying one or more criteria indicated in the third policy data to one or more attributes of the first printing device;
wherein the one or more attributes of the first printing device must satisfy the one or more criteria indicated in the third policy data in order for the first print feature and option data to be sent to the second client device.

18. The one or more non-transitory storage media of claim 16, wherein:
the policy data is first policy data;
the client device is a first client device;
the first policy data is associated with the first client device;
the instructions, when executed by the one or more processors, further cause:
storing second policy data that is different than the first policy data, wherein the second policy data is associated with a second client device that is different than the first client device;
applying one or more criteria indicated in the second policy data to one or more attributes of the first printing device;
wherein the one or more attributes of the first printing device must satisfy the one or more criteria indicated in the second policy data in order for the first print feature and option data to be sent to the second client device.

19. The one or more non-transitory storage media of claim 16, wherein the instructions, when executed by one or more processors, further cause:
in response to receiving input, updating the policy data to generate updated policy data;
identifying a plurality of printing devices that the printer server has discovered; and
for each printing device of the plurality of printing devices, applying one or more criteria indicated in the updated policy to one or more attributes of said each printing device, wherein the one or more attributes of said each printing device must satisfy the one or more criteria indicated in the policy data in order for one or more client devices that are registered with the printer server to receive print feature and option data associated with said each printing device.

* * * * *